(12) United States Patent
Erickson

(10) Patent No.: US 10,737,423 B2
(45) Date of Patent: Aug. 11, 2020

(54) SYSTEMS AND METHODS FOR SEALANT INJECTION MOLDING

(71) Applicant: THE BOEING COMPANY, Chicago, IL (US)

(72) Inventor: Chris J. Erickson, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 851 days.

(21) Appl. No.: 14/839,017

(22) Filed: Aug. 28, 2015

(65) Prior Publication Data

US 2017/0057137 A1   Mar. 2, 2017

(51) Int. Cl.

| | |
|---|---|
| *B29L 31/26* | (2006.01) |
| *B29C 33/30* | (2006.01) |
| *B29C 45/14* | (2006.01) |
| *B29C 45/46* | (2006.01) |
| *B29C 45/17* | (2006.01) |
| *B29C 45/34* | (2006.01) |
| *B64F 5/40* | (2017.01) |

(52) U.S. Cl.
CPC ............. *B29C 45/46* (2013.01); *B29C 33/30* (2013.01); *B29C 45/14336* (2013.01); *B29C 45/1756* (2013.01); *B29C 45/34* (2013.01); *B64F 5/40* (2017.01); *B29C 2045/14459* (2013.01); *B29C 2791/006* (2013.01); *B29L 2031/265* (2013.01); *B32B 2581/00* (2013.01)

(58) Field of Classification Search
None
See application file for complete search history.

(56) References Cited

U.S. PATENT DOCUMENTS

| | | |
|---|---|---|
| 3,399,504 A | 9/1968 | Smith |
| 4,520,605 A | 6/1985 | Budd |
| 4,822,656 A | 4/1989 | Hutter, III |
| 5,013,791 A | 5/1991 | Kerr et al. |
| 5,304,747 A | 4/1994 | Hale, II |

(Continued)

FOREIGN PATENT DOCUMENTS

| | | |
|---|---|---|
| EP | 1023979 A2 | 8/2000 |
| EP | 1147750 A1 | 10/2001 |

(Continued)

OTHER PUBLICATIONS

Omega, Technical Principles of Valves, Mar. 7, 2015 (Year: 2015).*

(Continued)

*Primary Examiner* — Jeffrey M Wollschlager
*Assistant Examiner* — Armand Melendez
(74) *Attorney, Agent, or Firm* — Joseph F. Harding; The Small Patent Law Group LLC

(57) ABSTRACT

A mold tool is provided that includes plural mold sub-volumes configured to receive a sealant, a mold channel in fluid communication with the mold sub-volumes, a sealant injection port in fluid communication with the mold channel, vacuum application ports in fluid communication with the mold sub-volumes, and an air control system. The air control system is operably coupled to the mold sub-volumes and the mold channel, and is configured to apply a vacuum to the mold sub-volumes via the vacuum application ports.

20 Claims, 17 Drawing Sheets

(56) References Cited

U.S. PATENT DOCUMENTS

| | | | |
|---|---|---|---|
| 5,593,120 | A | 1/1997 | Hamerski |
| 6,725,620 | B2 | 4/2004 | Dai |
| 6,815,047 | B1 * | 11/2004 | Kitayama ............... B29C 44/22 264/41 |
| 7,575,208 | B2 | 8/2009 | Lan |
| 7,900,655 | B2 | 3/2011 | Morton et al. |
| 8,292,253 | B2 | 10/2012 | Zhadanov |
| 2002/0162537 | A1 | 11/2002 | Smith et al. |
| 2002/0185785 | A1 | 12/2002 | Thrash |
| 2003/0131826 | A1 | 7/2003 | Smith et al. |
| 2004/0232573 | A1 | 11/2004 | Nakamura et al. |
| 2007/0181903 | A1 * | 8/2007 | Takakura ............... B29C 39/10 257/100 |
| 2009/0057510 | A1 | 3/2009 | Orban |
| 2010/0229365 | A1 * | 9/2010 | Kipp ................. B29C 45/1756 29/428 |
| 2011/0115117 | A1 * | 5/2011 | Desmith ............. B29C 33/306 264/219 |
| 2011/0169195 | A1 * | 7/2011 | Yoo ...................... B29C 45/02 264/328.1 |
| 2012/0217673 | A1 | 4/2012 | Hutter, III |
| 2013/0062816 | A1 * | 3/2013 | Kurihara ............. B29C 33/405 264/460 |
| 2015/0108685 | A1 * | 4/2015 | Pajel .................... B29C 70/681 264/275 |

FOREIGN PATENT DOCUMENTS

| | | |
|---|---|---|
| EP | 2865509 A2 | 4/2015 |
| WO | 9520102 A1 | 7/1995 |

OTHER PUBLICATIONS

Air Logic, Pneaumatics and Hydraulics, Sep. 20, 2012 (Year: 2012).*

European Office Action for co-pending European Patent Application No. 16183311.6-1706; dated Oct. 16, 2017 (5 pages).

Extended European Search Report for copending European Patent Application No. 16183311.6-1706; dated Jan. 20, 2017, 5 pages.

Office Action for co-pending Canadian Patent Application No. 2,932,824 dated Jun. 10, 2019 (7 pages).

Office Action for co-pending Canadian Patent Application No. 2,932,824 dated Jan. 10, 2020 (6 pages).

Examination Report dated May 7, 2020 for corresponding European Patent Application No. 16 183 311.6-1014 (5 pages).

* cited by examiner

SYSTEMS AND METHODS FOR SEALANT INJECTION MOLDING

FIELD OF EMBODIMENTS OF THE DISCLOSURE

Embodiments of the present disclosure generally relate to systems and methods for sealant injection molding.

BACKGROUND OF THE DISCLOSURE

Various structures to be sealed may have fasteners or other features that are to be sealed. For example, a nutplate ring of an access hole of an airplane wing may be sealed. However, conventional approaches to sealing such structures rely on manual application of sealant. Manual application of sealant may provide an undesired amount of sealant, and/or require an undesired amount of time for application of sealant and subsequent trimming or removal of excess sealant.

SUMMARY OF THE DISCLOSURE

Accordingly, reduction of time and/or expense of sealing structures, (such as access ports of airplane wings, are provided in various embodiments disclosed herein. It may be noted that in various embodiments, one or more aspects of the presently disclosed subject matter may be utilized in conjunction with the sealing of other structures or fastener configurations than the illustrated examples of access port nut plates.

Certain embodiments of the present disclosure provide a mold tool that includes plural mold sub-volumes configured to receive a sealant, a mold channel in fluid communication with the mold sub-volumes, a sealant injection port in fluid communication with the mold channel, vacuum application ports in fluid communication with the mold sub-volumes, and an air control system. The air control system is operably coupled to the mold sub-volumes and the mold channel, and is configured to apply a vacuum to the mold sub-volumes via the vacuum application ports.

Certain embodiments of the present disclosure provide a mold tool for providing sealant to features of a target workpiece. The mold tool includes a frame, a mold body, an air control system, and a vacuum assembly. The mold body is coupled to the frame, and defines a mold volume configured to receive the sealant. The mold volume includes plural mold sub-volumes, and a mold channel. The mold body includes a sealant injection port in fluid communication with the mold volume, and vacuum application ports in fluid communication with the mold sub-volumes. The air control system is operably coupled to the mold body, and is configured to apply a vacuum to mold volume via the vacuum application ports. The vacuum assembly is operably coupled to the mold body and the air control system. The vacuum assembly includes a vacuum plate and vacuum generators mounted on the vacuum plate. The vacuum generators are configured to apply the vacuum to the mold volume under control of the air control system.

Certain embodiments of the present disclosure provide a method. The method includes injection sealant into a number of mold sub-volumes disposed over corresponding features of an object to be sealed. The method also includes drawing the sealant from a higher pressure zone into a lower pressure zone in at least one of the sub-volumes to cover at least one of the features.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for sealing using a sealant application mold. Various embodiments eliminate the use for manual application of sealant, reduce the time for applying sealant, and improve quality. In various embodiments, a sealant injection system (e.g., mold tool 10, 11, 1400) secures itself to a workpiece (e.g., a panel having an opening surrounded by a nutplate) using a mechanical lock and/or a vacuum. A vacuum may be provided during sealant injection to extract air, eliminate air bubbles in sealant material, and/or improve sealant flow. It may be noted that sealant may be injected via one or more ports, and may be injected into the ports either manually or automatically. The vacuum application ports at which the vacuum is applied may be positioned at locations corresponding to features (e.g., nutplates) of the workpiece. For example, after each nutplate cavity or dome is filled with sealant, a small amount of sealant may enter corresponding orifices positioned at the tops of the nutplate cavity or dome to block the vacuum.

Embodiments of the present disclosure provide improved sealing. Reduction of time and/or improvement in quality are accordingly provided as discussed herein.

Figure 1:
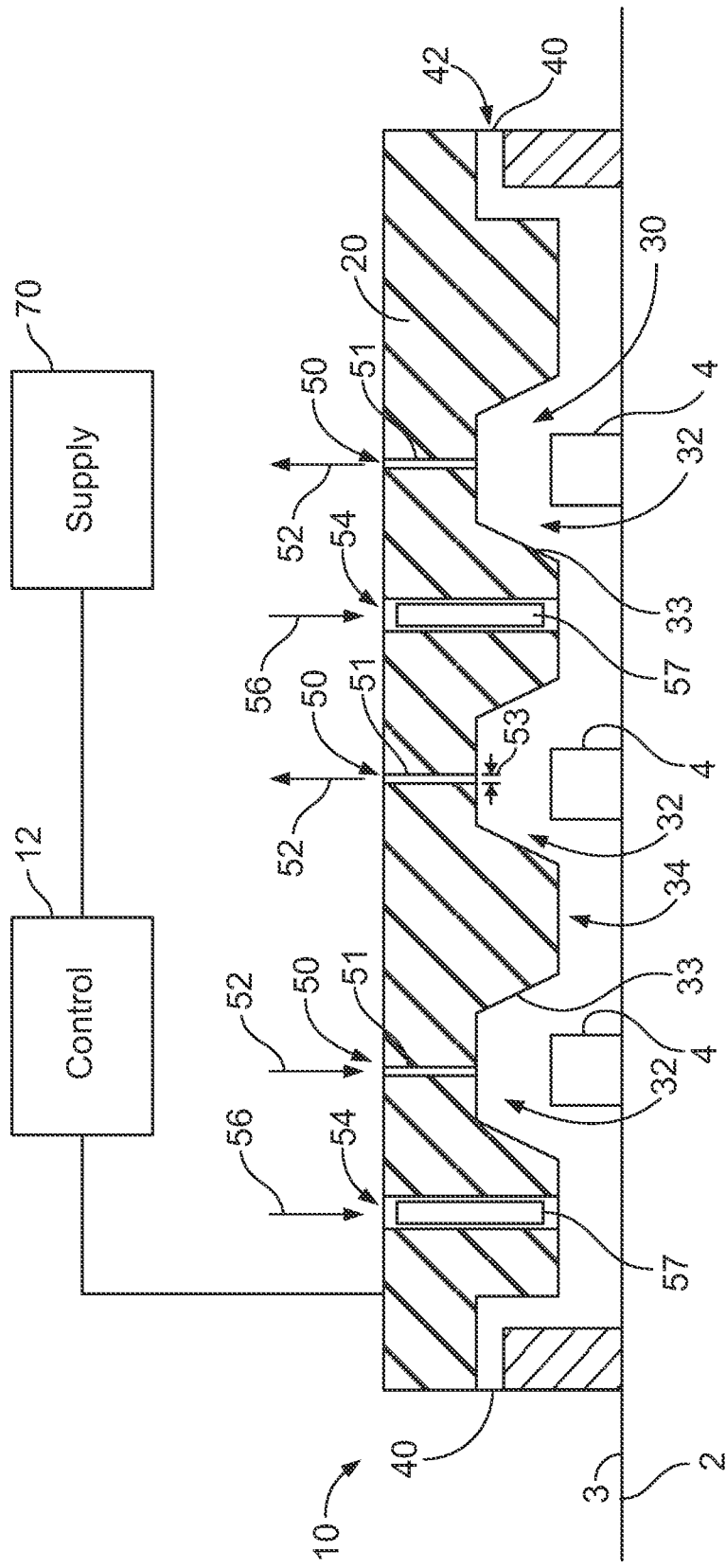
FIG. 1 illustrates a schematic side sectional view diagram of a mold tool, according to an embodiment of the present disclosure.

FIG. 1 illustrates a schematic side sectional view of a mold tool 10, according to an embodiment of the present disclosure. The mold tool 10 is configured to provide sealant 42 to features 4 (e.g., to a volume surrounding features 4) of a target workpiece 2. The features 4 are examples of objects to be sealed. As seen in the illustrated embodiment, the target workpiece 2 has a surface 3 to which the mold tool 10 is secured or otherwise engages. As shown in FIG. 1, the features 4 extend from the surface 3. The target workpiece 2, for example, may have a nutplate ring, and the features 4 may be nutplates, as discussed in more detail elsewhere herein. As seen in FIG. 1, the depicted mold tool 10 includes a mold body 20 and an air control system 12. The mold body 20 is generally configured for delivery of the sealant 42 to the features 4 and/or other portions of the workpiece 2 and maintenance of the sealant 42 around the features 4 and/or other portions of the workpiece 2 during curing of the sealant 42. The air control system 12 receives air from a supply 70 (e.g., a shop supply of pressurized air), and directs air to various components of the mold tool 10 at appropriate times during a sealing process. It may be noted that the particular numbers, sizes, shapes, and/or relationships between aspects or components depicted in FIG. 1 are provided by way of example, and that various alternative numbers, types, sizes, shapes, and/or arrangements may be employed in other embodiments.

The depicted mold body 20 defines a mold volume 30. The mold volume 30 is configured to receive the sealant 42. The mold volume 30 of the illustrated embodiment includes mold sub-volumes 32 and a mold channel 34. Each of the depicted mold sub-volumes 32 is disposed in a predetermined position corresponding to the location of a corresponding feature 4 when the mold tool 10 is secured in a desired position to the workpiece 2. The size and shape of the mold sub-volumes 32 are configured to provide a desired amount of sealant 42 around the features 4. The shape of mold sub-volumes 32 may generally correspond to the shape of the features 4, but need not be identically shaped. The mold sub-volumes 32 are sized to be large enough to allow a desired amount of sealant 42 to cover the features 4. The channel 34 connects the various mold sub-volumes 32 and provides a passageway for the sealant 42 to reach the mold sub-volumes 32.

As also seen in FIG. 1, the depicted mold body 20 also includes a sealant injection port 40 (the depicted example includes two sealant injection ports 40). The sealant injection port 40 is in fluid communication with the mold volume 30. Generally, the sealant injection port 40 is configured to provide entry of the sealant 42 into the mold volume 30. The mold tool 10, and the mold sub-volumes 32 help to accurately and reliably provide a desired amount of sealant to target features (e.g., features 4) of the workpiece 2, while eliminating or reducing any excess sealant 42 that may need to be trimmed away after a sealing process. The mold tool 10 also helps maintain the sealant 42 in a desired position and/or shape during curing of the sealant 42.

Further, the depicted mold body 10 includes vacuum application ports 50 in fluid communication with the mold sub-volumes. In some embodiments, the vacuum application ports 50 may be in fluid communication with each other, for example via a vacuum channel (e.g., vacuum channel 109 depicted in FIGS. 11A, 11B, and 11D) as discussed elsewhere herein. In the illustrated embodiment, each vacuum application port 50 is disposed above a corresponding mold sub-volume 32, and configured to apply a vacuum 52 to the corresponding mold sub-volume 32, under the direction of the control system 12, during the injection of the sealant 42. The vacuum 52 applied via the vacuum application ports 50, for example, helps to eliminate or reduce the formation of air bubbles during a sealing process, and also may help to draw the mold tool 10 to the workpiece 2 during use. The vacuum 52 may also help remove volatiles or gases from the mold volume 30.

The air control system 12 is operably coupled to the mold body 20, and is configured to apply a vacuum 52 to the vacuum application ports 50. As used herein, a vacuum may refer to a reduced pressure that draws material away from a volume to which the vacuum is placed in fluid communication. It may be noted that the strength of the vacuum and/or the size of the vacuum application ports 50 may be selected to prevent inhibit the sealant 42 from passing through the vacuum application ports 50. For example, the size at least a portion of the vacuum application ports 50 may be sized such that the viscosity of the sealant 42 prevents passage of the sealant 42 completely through the vacuum application ports 50 (although, in some embodiments, a nominal amount of sealant may enter the vacuum application ports 50.

Figure 2:
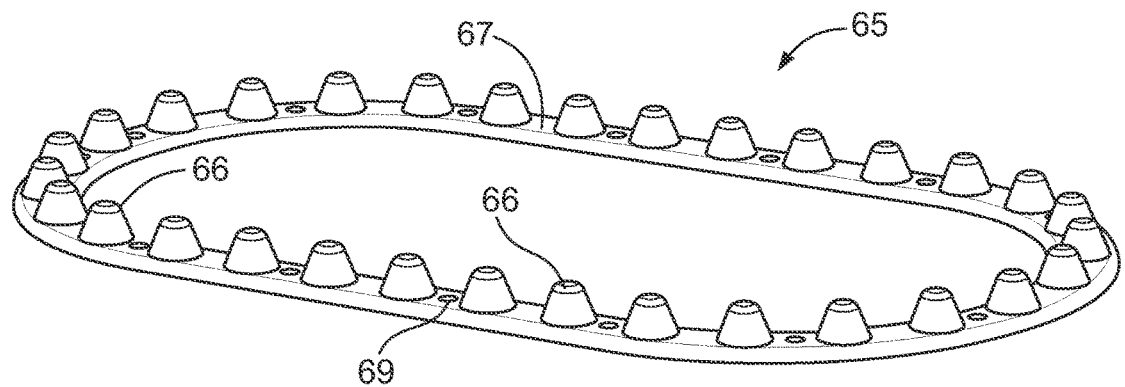
FIG. 2 is a perspective view of a sealing member formed with a mold tool, according to an embodiment of the present disclosure.
Figure 3:
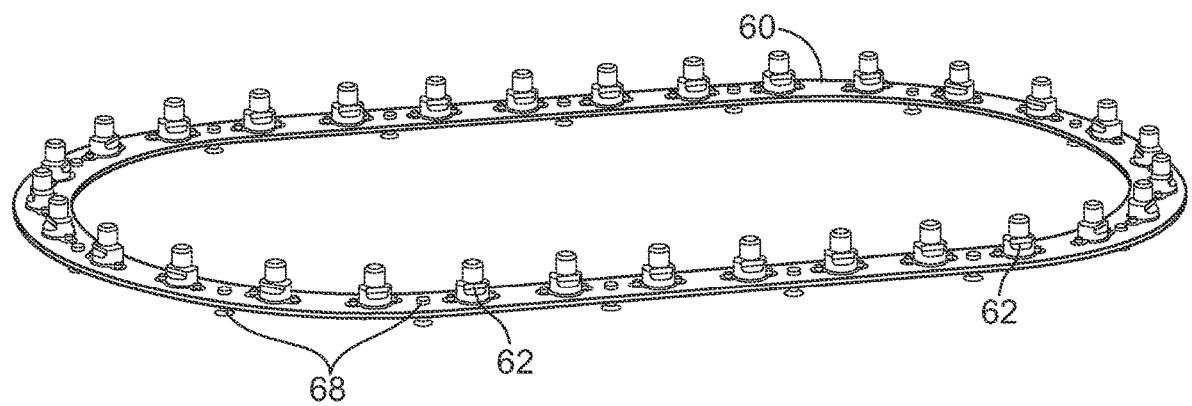
FIG. 3 is a perspective view of a nutplate member to be sealed by the sealing member of FIG. 2.

With reference to FIGS. 2 and 3, in some embodiments, the workpiece 2 may be a nut plate member 60 (e.g., a ring-shaped member configured to be disposed around an access hole of a wing of an airplane) having plural nut plates 62 disposed around the nut plate member 60. The mold sub-volumes 32 may be configured as nut plate domes 33 (see FIG. 1), with the nut plate domes 33 sized and configured to be positioned over corresponding nut plates 62 when the mold tool 10 is in position to seal the nut plate member 60. With the sealant 42 cured, and the mold tool 10 removed a sealing member 65 (see FIG. 2) may be provided and left in place over the nut plate member 60.

As seen in FIG. 2, the sealing member 65 comprises raised portions 66 (formed by and corresponding to the mold sub-volumes 32) and flat portions 67 (formed by and corresponding to the mold channel 34). The flat portions 67 may also help provide sealant around rivets 68 used to secure the nut plate member 60 in place. The mold tool 11 may also be configured to provide raised portions 69 over the rivets 68.

In the embodiment depicted in FIG. 1, the mold tool 10 also includes separation ports 54 that are in fluid communication with the mold volume 30. The air control system 12 is configured to apply a separation pressure 56 to the sealant 42 via the separation ports 54. For example, the air control system 12 may direct a positive pressure from the air supply 70 to the mold volume 30 via the separation ports 54. The separation pressure 56 provided via the separation ports 54 may be applied after the sealant 42 has cured, and used to help separate cured sealant 42 from the mold body 20, and/or provide a film of air between cured sealant 42 and the mold body 20, facilitating removal of the mold tool 10 from the workpiece 2 after the sealant 42 has cured.

In some embodiments, the mold tool 10 may also include separation pistons 57 associated with the separation ports 56, with the air control system 12 configured to switch the separation ports 56 between open and closed positions with the separation pistons 57. For example, in one position, the separation pistons 57 may prevent the flow of air under positive pressure to the mold volume 20 via the separation ports 56 (e.g., during injection and curing of sealant), while in another position the separation pistons 57 may allow the flow of air under positive pressure to the mold volume 20 via the separation ports 56.

Figure 4A:
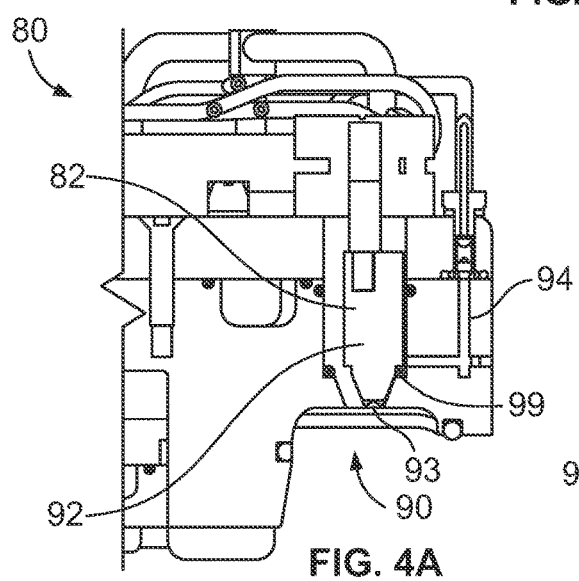
FIG. 4A depicts a side schematic view of a separation port assembly in a closed position, according to an embodiment of the present disclosure.
Figure 4B:
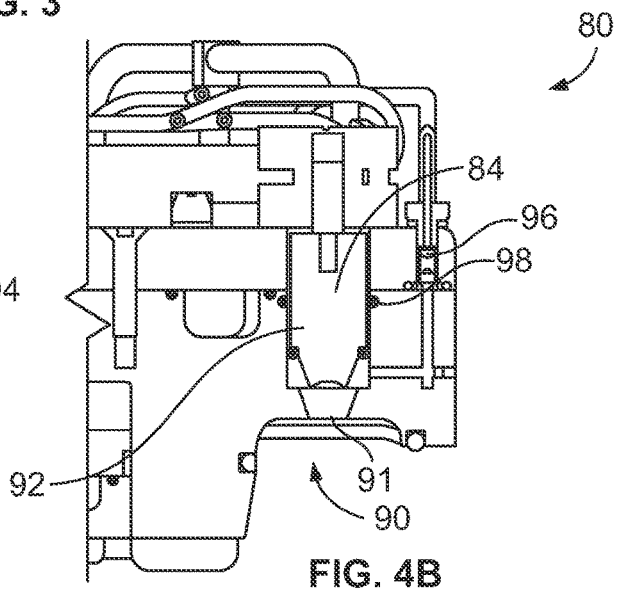
FIG. 4B depicts the separation port assembly of FIG. 4A in an open position.

FIG. 4A depicts a side schematic view of a separation port assembly 80 in a closed position 82, and FIG. 4B depicts a side schematic view of the separation port assembly 80 in an open position 84. As seen in FIGS. 4A and 4B, the separation port assembly 80 includes a separation port 90 with a separation piston 92 disposed therein. The separation port assembly 80 also includes an air transfer hole 94. An orifice 96 (e.g., a 0.020" set screw orifice) is provided in the illustrated embodiment to provide a desired air flow through the air transfer hole 94. An upper O-ring 98 and a lower O-ring 99 are provided to help seal the separation port 90. The separation port 90 includes release ports 91 for providing a controlled flow of air to an associated mold volume (e.g., mold volume 30). The separation piston 92 of the illustrated embodiment includes a concave tip 93. When in the closed position 82, the separation piston 92 blocks flow of air from air transfer hole 94 to and through the separation port 90. When in the open position 84, the separation piston 92 allows the flow of air from air transfer hole 94 to and through the separation port 90. The position of the separation piston 92 may be controlled, for example, by an air control system such as air control system 12. The concave tip 93 may be configured to position sealant to provide raised portions 69 disposed above rivets 68.

With continued reference to FIG. 1, in the illustrated embodiment the vacuum application ports 50 include orifices 51. The orifices 51 are sized and configured to prevent or inhibit the flow of sealant 42 upward through the vacuum application ports 51. In the illustrated embodiment, the orifices 51 have a diameter 53 that is sized and configured to inhibit the flow of sealant 42 through the orifices 51. For example, in some embodiments, the diameter may be 0.010 inch or less. The size and the shape of the orifices 51 may vary in different embodiments, for example depending on the viscosity of the sealant 42. For instance, a smaller diameter may be employed with less viscous sealants, and a larger diameter may be employed with more viscous sealants. While the particular size of diameter may vary for different applications (e.g., different diameters may be used for different sealants), it may be noted that a properly sized diameter prevents a large quantity of sealant from being drawn away from the sub-volumes and unused, or from being drawn past the vacuum application ports and into an interior of the mold tool. The sealant injection passages in the device have a known volume and the volume of the final cured sealant on the nutplate has a known value which allows control of a known amount of sealant for every sealant operation to minimize or reduce waste.

In various embodiments, the mold body 20 may be made of a translucent or transparent material. Accordingly, an operator may be able to view the amount of sealant 42 inside the mold volume 30 and stop addition of sealant 42 after a desired amount of sealant 42 is observed in the mold volume 30.

Figure 5A:
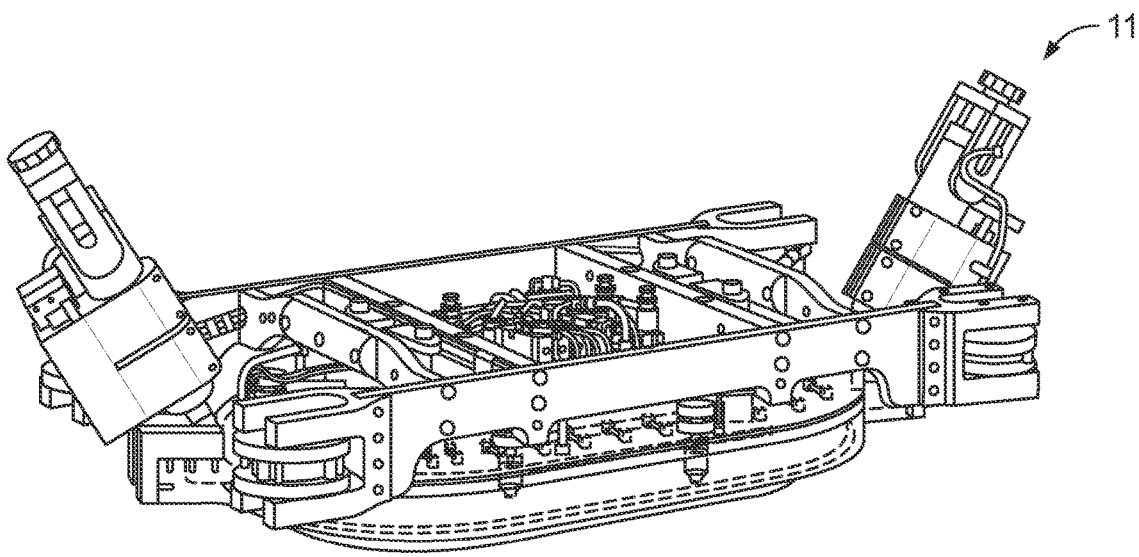
FIG. 5A depicts a perspective view of a mold tool adapted to providing sealant to a nutplate ring, according to an embodiment of the present disclosure.
Figure 5B:
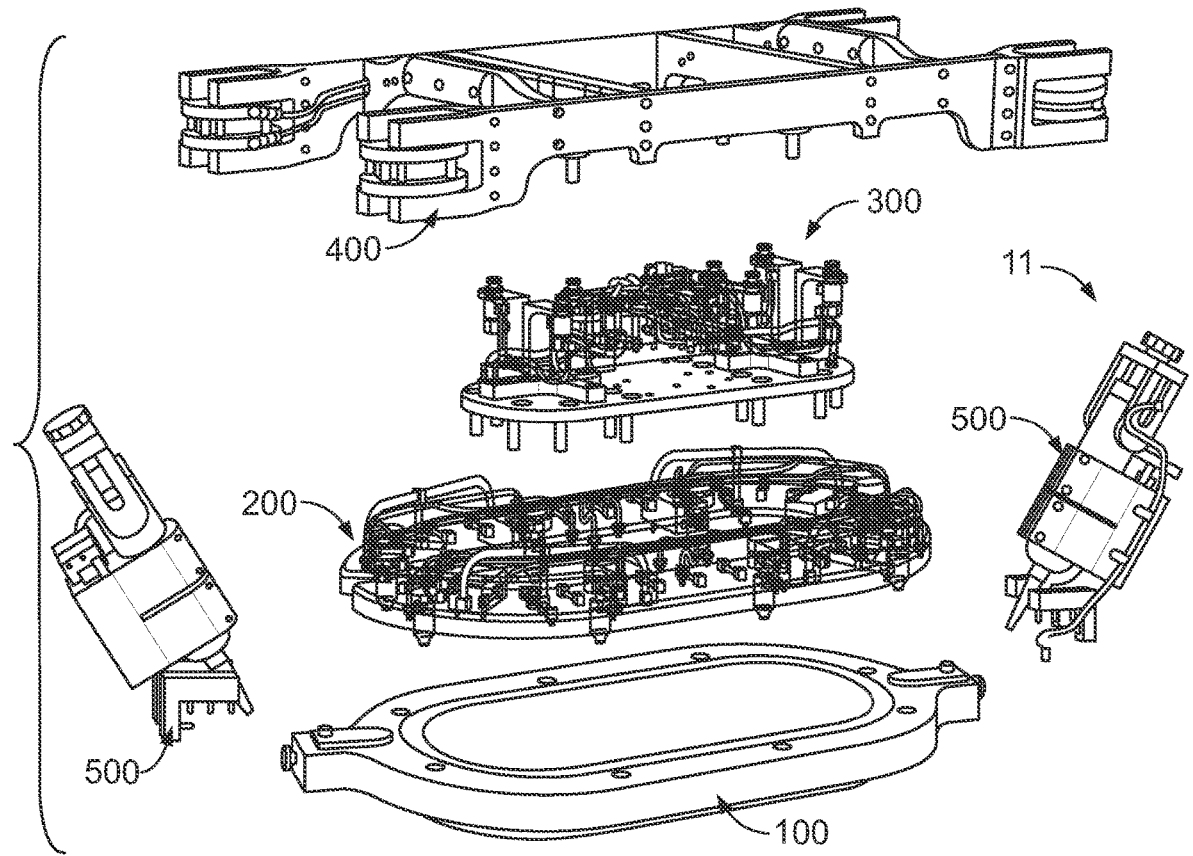
FIG. 5B depicts an exploded perspective view of the mold tool of FIG. 5A.

As discussed in connection with FIG. 1, the mold tool 10 may be used to provide sealant to a nutplate member 60. FIG. 5A depicts a perspective view of a mold tool 11 particularly adapted to providing sealant to a nutplate ring, for example a nutplate ring used in conjunction with an access opening of an airplane (e.g., an access opening of an airplane wing), and FIG. 5B depicts an exploded perspective view of the mold tool 11. It may be noted that various aspects of the mold tool 11 discussed herein may be used in conjunction with other alternative sealing applications as well.

As seen in FIGS. 5A and 5B, the mold tool 11 includes a mold assembly 100, a vacuum assembly 200, an air control mount assembly 300, a frame 400, and an injection assembly 500. Generally, the mold assembly 100 provides a desired amount and positioning of sealant to a target location. The vacuum assembly 200 provides a vacuum during injection of sealant to help minimize or reduce air bubble formation in sealant during application. The air control mount assembly 300 provides control to the various components of the mold tool 11, and the injection assembly 500 may be utilized to deliver sealant to the mold assembly 100.

In the illustrated embodiment, each of the sub-assemblies (mold assembly 100, vacuum assembly 200, air control mount assembly 300, frame 400, and injection assembly 500) are configured to work in conjunction with each other to provide injection molding, while still allowing for convenient assembly and disassembly for clean-up and/or maintenance. For example, various of the sub-assemblies may be configured to allow assembly and disassembly without requiring disconnecting and reconnecting hoses or tubes. In some embodiment, one or more sub-assemblies (mold assembly 100, vacuum assembly 200, air control mount assembly 300, frame 400, and injection assembly 500) may be removed intact and separately cleaned, and subsequently reattached.

Figure 6:
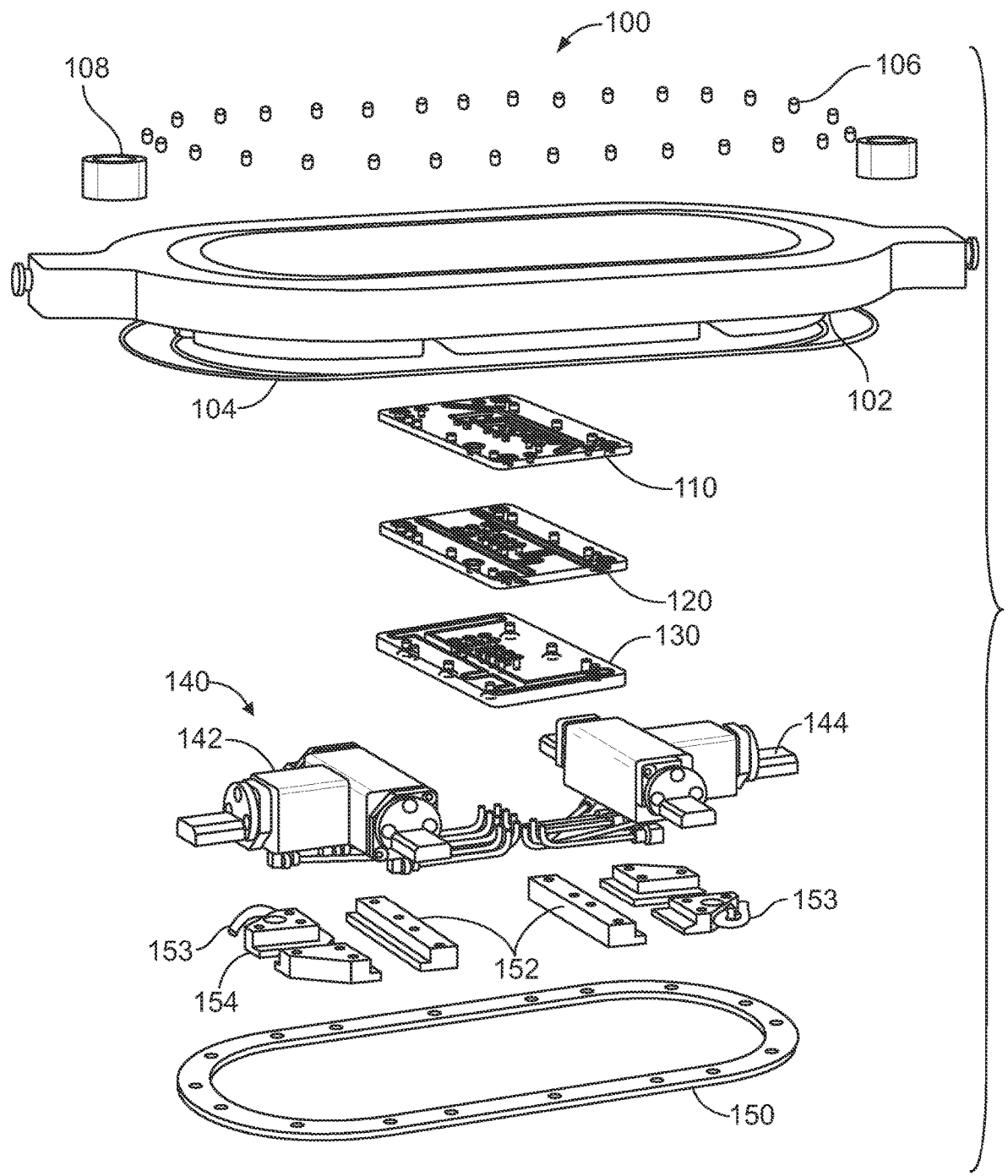
FIG. 6 provides an exploded perspective view of a mold assembly, according to an embodiment of the present disclosure.

FIG. 6 provides an exploded perspective view of the mold assembly 100. As seen in FIG. 6, the mold assembly 100 includes a mold body 102, mold volume seals 104, mold volume orifices 106, injection port inserts 108, a first air transfer plate 110, a second air transfer plate 120, a third air transfer plate 130, a lock assembly 140, lock assembly brackets 152, brackets 154, and a retaining ring 150.

Figure 11A:
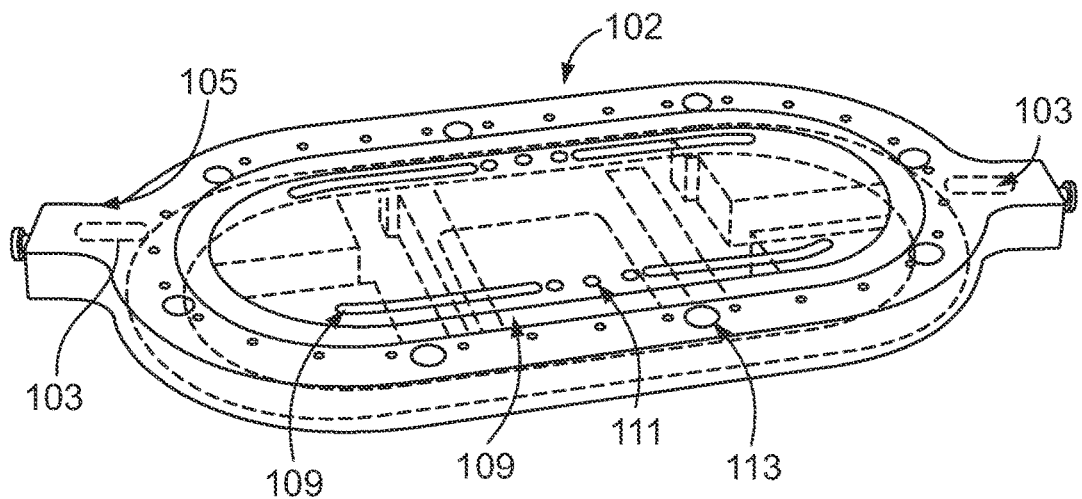
FIG. 11A depicts a top perspective view of a mold body, according to an embodiment of the present disclosure.
Figure 11B:
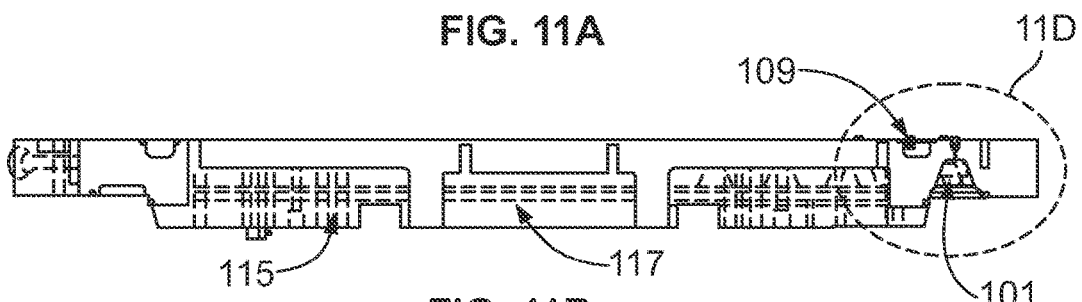
FIG. 11B depicts a side sectional view of the mold body of FIG. 11A.
Figure 11C:
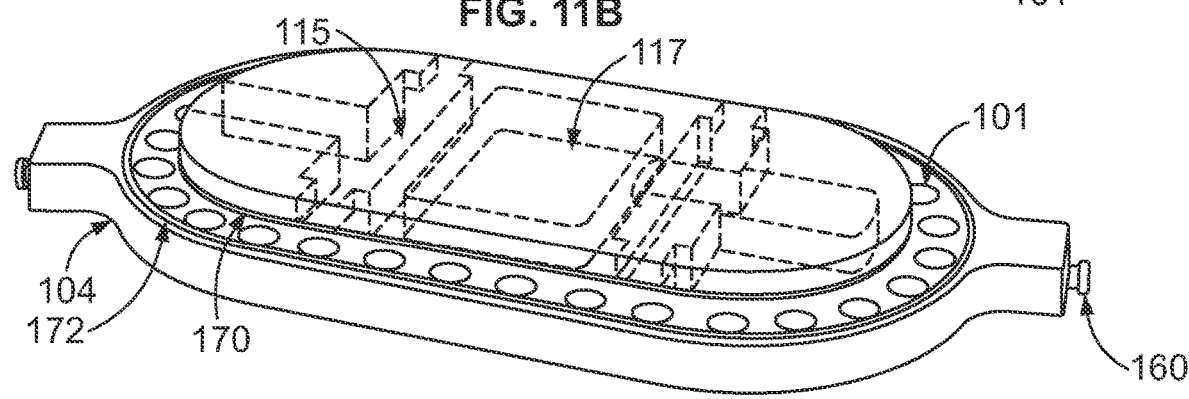
FIG. 11C depicts a bottom perspective view of the mold body of FIG. 11A.
Figure 11D:
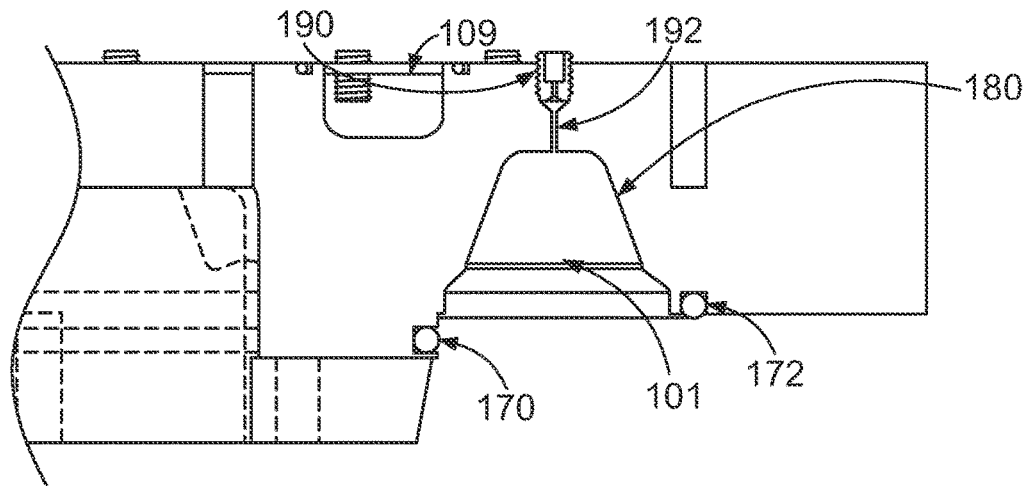
FIG. 11D provides an enlarged view of a portion of FIG. 11B.

The mold body 102 may be understood as a primary component of the mold assembly 100. The mold body 102, for example, may incorporate various aspects of the mold body 20 discussed herein. For example, the mold body 102 may be composed of a clear material (e.g., acrylic). Use of a clear material allows the sealant injection process to be viewed. FIG. 11A depicts a top perspective view of the mold body 102, FIG. 11B depicts a side sectional view of the mold body 102, FIG. 11C depicts a bottom perspective view of the mold body 102, and FIG. 11D provides an enlarged view of a portion of FIG. 11B. As seen in FIGS. 11A-11D, the mold assembly 100 includes a mold volume 101 defined with the mold body 102, as well as injection ports 103, injection port tabs 105, air transfer grooves 107, a vacuum channel 109, air transfer holes 111 separation piston pockets 113, lock cylinder pockets 115, and air transfer plate pockets 117.

Generally, the mold volume 101 provides a volume into which sealant (e.g., sealant 42) is injected and formed about a target (e.g., nutplate member 60). The sealant 42 may fill the mold volume 101 from the injection ports 103. In the illustrated embodiment, two injection ports 103 are proved at opposite ends of the mold body 102. When the flow of sealant 42 from the injection ports 103 meet and melt together, the injection of the sealant 42 may be stopped and left to cure for predetermined amount of time. As discussed herein, a vacuum applied within the mold volume 101 helps remove air or any voids during the injection process, and also may assist flow of the sealant 42. In the depicted embodiment, the mold volume 101 is designed to provide a minimum of 0.100" of sealant on each surface it protects (e.g., each surface of the nutplate member 60 and nutplates 62). As the mold body 102 is designed to be removed, angles within the mold volume 101 may be open and have polished surfaces to facilitate removal.

Vacuum ports (e.g., vacuum application ports 50) may be associated with the mold volume 101 and located at positions where air pockets may have an increased tendency to form, such as directly above the nutplates 62. For example, as best seen in FIG. 11D, the mold volume 101 may include a nut plate dome 180. A first orifice 192 may be disposed directly above the nut plate dome 180, with a set screw orifice 190 disposed above the first orifice 192. The first orifice 192 may have a diameter of about 0.020 inches, and the set screw orifice 190 may have a diameter of about 0.010 inches. A set screw orifice 190 may be employed due to the difficulty of forming a diameter as small as 0.010 inches or less in acrylic, which may be used for the mold body 102. A vacuum (e.g., vacuum 52 depicted in FIG. 1) may be applied to the mold volume 101 via a series of set screw orifices 190 in fluid communication with corresponding nut plate domes 180 of the mold volume 101. Further, a vacuum channel 109 may be provided in fluid communication with the set screw orifices 190 to provide uniform or consistent application of the vacuum (e.g., vacuum 52 depicted in FIG. 1). Use of the set screw orifices 190 in the illustrated embodiment helps inhibit or prevent flow of the sealant 42 upwards past the set screw orifice 190, thereby maintaining the vacuum (e.g., vacuum 52 depicted in FIG. 1) for the desired length of time as well as simplifying clean-up after use of the mold tool 11.

As best seen in FIGS. 11C and 11D, the mold assembly 100 includes mold volume seals 104. In the illustrated embodiment the mold volume seals 104 include an inner seal 170 and an outer seal 172. The inner seal 170 and outer seal 172, for example, may be o-ring seals that are placed in contact with a workpiece surface (e.g., surface 3 of workpiece 2) to create a seal for maintaining a vacuum (e.g., vacuum 52 depicted in FIG. 1) within the mold volume 101. For example, the outer seal 172 may be in contact with an inner surface of a wing panel (e.g., first surface 1702 depicted in FIG. 17), and the inner seal 170 may be in contact with an access hole (e.g., opening 1704 depicted in FIG. 17) associated with the nutplate member 60. In various embodiments, a positive air pressure may be applied to the inner seal 170 and/or the outer seal 172 to urge the inner seal 170 and/or the outer seal 172 against the workpiece 2, helping to overcome any imperfections or differences (e.g., differences within manufacturing tolerances) between the mold tool 11 and the workpiece 2. It may be noted that a positive air pressure may similarly be applied to other seals (e.g., seals associated with the vacuum assembly 200).

As best seen in FIG. 11D, the nutplate dome 180 is a pocket formed within the mold volume 101 that surrounds a corresponding nutplate 62 of the nutplate member 60. The nutplate dome 180 may be sized and configured to provide at least 0.100 inches of sealant around the corresponding nutplate 62. The nutplate domes 180 may be positioned about the mold volume 101 to be centered about or aligned with the positions of the nutplates 62. The mold volume orifices 106 (see FIG. 6) (e.g., nutplate dome orifices such as set screw orifices 190) are configured to allow a vacuum (e.g., vacuum 52 depicted in FIG. 1) to be provided within the mold volume 101 yet prevent, inhibit, or minimize the flow of the sealant 42 (due to the viscosity of the sealant 42) from entering aspects outside of the mold volume 101.

The injection ports 103 provide an opening for injection of the sealant 42 into the mold volume 101. In the illustrated embodiment, a total of two injection ports 103 are provided on opposite sides of the mold body 102, so that the (injection assembly 500 (see FIGS. 5B and 10) only need to push sealant flow for half of the length of the mold body 102. For example, if the mold body 102 is 46 inches long, the sealant 42 only needs to be pushed by the injection assembly 500 (see FIGS. 5B and 10) a distance of 23 inches. Reducing the distance the sealant 42 must be pushed reduces the effort required to push the sealant 42. For example, in some embodiments, a shop supply of air (e.g., supply 70) at 90 pounds per square inch (psi) provided to the injection assembly 500 (see FIGS. 5B and 10) may be sufficient to push the sealant 42 through the mold volume 101.

Figure 7:
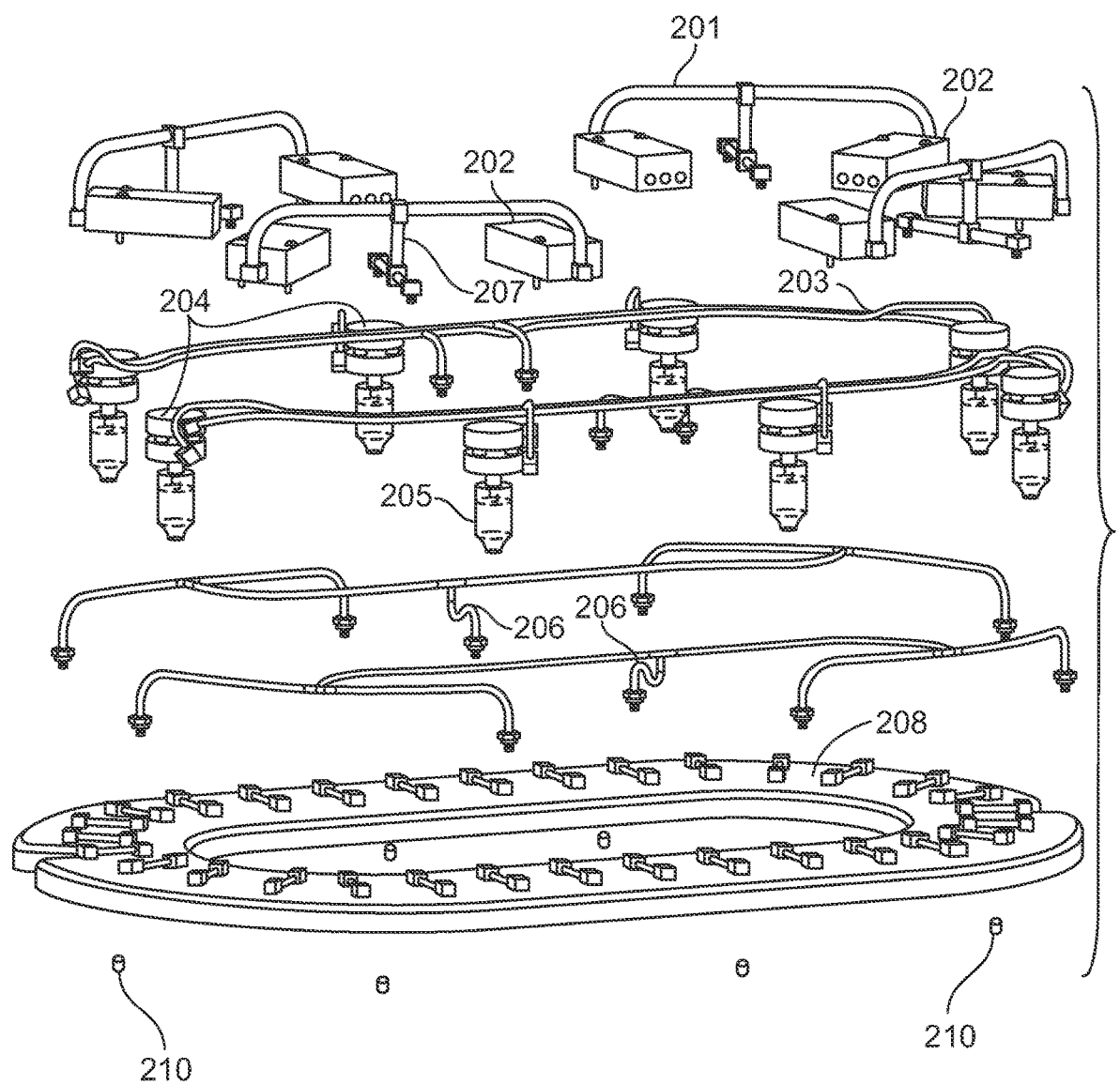
FIG. 7 provides an exploded perspective view of a vacuum assembly, according to an embodiment of the present disclosure.

As best seen in FIG. 11A, the mold tool 11 (see FIGS. 5A and 5B) also includes separation piston pockets 113, which are configured to accept separation pistons (e.g., separation pistons 205 as seen in FIG. 7). The separation pistons 205, (or separation pistons 92 depicted in FIGS. 4A and 4B) are configured to control access to the separation ports (e.g., separation ports 90, 54). As also discussed in connection with FIGS. 4A and 4B, when the separation ports 90 are opened, pressurized air is introduced into the mold volume 101 (see, e.g., FIGS. 11B-11D) and can help separate the mold body 102 (see, e.g., FIG. 6) from the sealant 42 after the sealant 42 is cured. When closed, the separation ports 90 form part of a surface of the mold volume 101 (see, e.g., FIGS. 11B-11D) forming the raised portions 69 (see, e.g., FIGS. 2 and 3) above the rivets 68 (see, e.g., FIGS. 2 and 3) via the concave tip 91. Because of the small size of the raised portions 69 (see, e.g., FIGS. 2 and 3), a relatively small air cylinder may overcome the surface adhesion and separate the separation pistons 92 from the sealant 42 to allow the pressurized air into the mold volume 101 (see, e.g., FIGS. 11B-11D) to separate the mold body 102 from the cured sealant 42.

As best seen in FIGS. 11A, 11B, and 11D, the vacuum channel 109 is formed in the mold body 102. For example, the vacuum channel 109 may be machined into the mold body 102 at a position corresponding to the location of the vacuum plate 208 (see FIG. 7). The vacuum channel 109 is in fluid communication with the set screw orifices 190, and used to store and transfer a vacuum generated by the vacuum generators 202 (see FIG. 7). For example, the vacuum channel 109 may evenly distribute a vacuum generated by the vacuum generators 202 to the various nut plate domes 180 of the mold volume 101.

With continued reference to FIGS. 1-11, it may be noted that the air control mount assembly 300 may include a control system (e.g., air control system 12) that utilizes an air-controlled logic to perform various functions discussed herein. Various air pathways may be designed into one or more of the various sub-assemblies (mold assembly 100, vacuum assembly 200, air control mount assembly 300, frame 400, and injection assembly 500) such that the one or more of the various sub-assemblies (mold assembly 100, vacuum assembly 200, air control mount assembly 300, frame 400, and injection assembly 500) may be conveniently detached from the mold tool 11. For example, color coded tubing may be used, as well as pockets, holes, or other pathways machined into components of the mold tool 11. O-rings or other seals may be employed to seal passageways or paths for the air control system 12 to control aspects of the various sub-assemblies. As seen, for example in FIG. 6, in the illustrated embodiment, air transfer plates (first air transfer plate 110, second air transfer plate 120, and third air transfer plate 130) are disposed within the air transfer plates pocket 117 (see FIGS. 11B and 11C), and used to control the flow of air among various subassemblies including the mold assembly 100. It may be noted that, while air-controlled logic is employed in the depicted embodiment, electronically controlled logic may be utilized alternatively or additionally in various embodiments.

Figure 12:
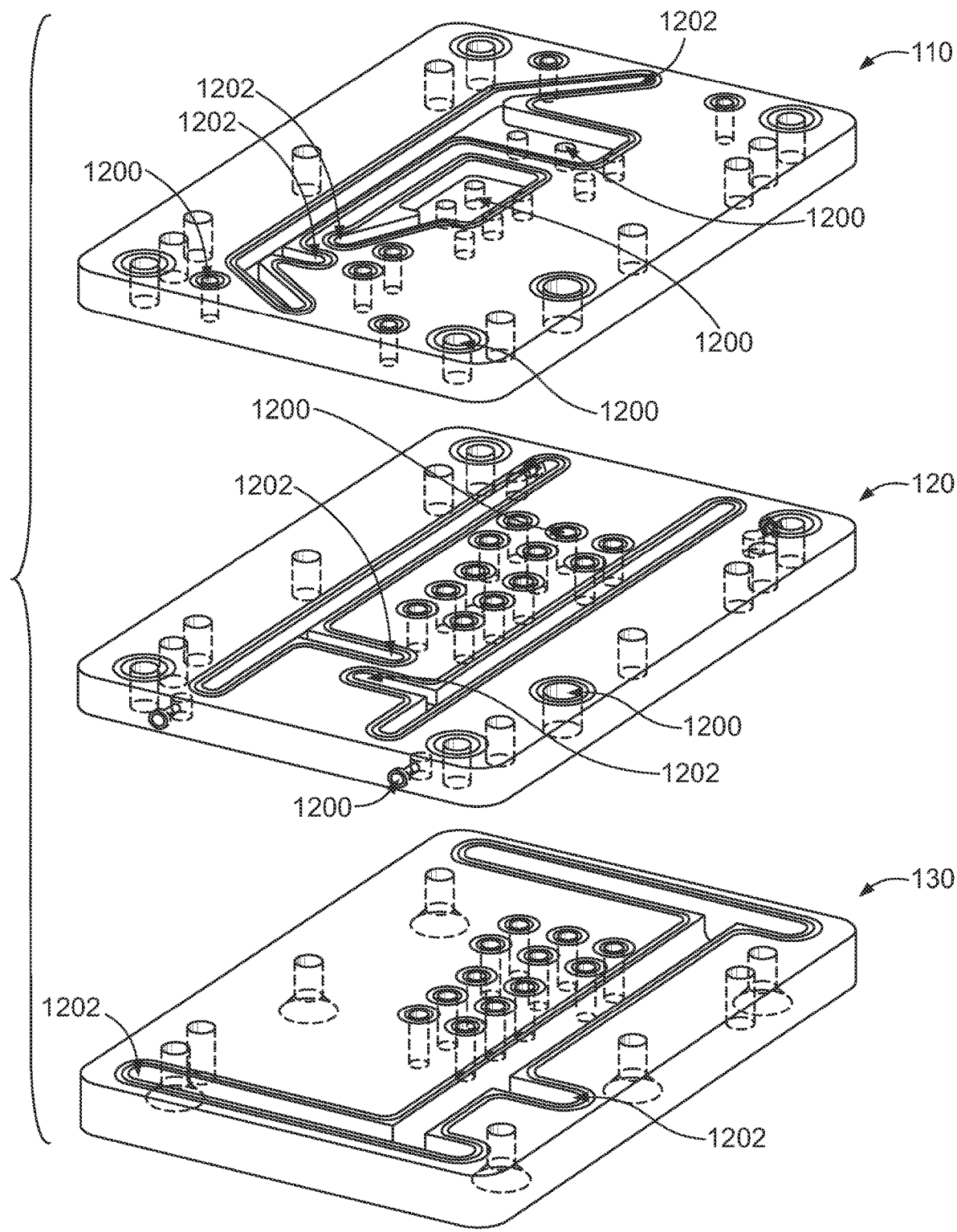
FIG. 12 is a perspective view of air transfer plates, according to an embodiment of the present disclosure.

FIG. 12 depicts an exploded perspective view of the first air transfer plate 110, the second air transfer plate 120, and the third air transfer plate 130. As seen in FIG. 12, the air transfer plates 110, 120, 130 include various holes 1200 and channels 1202. Generally, the holes 1200 pass through one or more plates and are used to transfer air from a source (e.g., supply 70) through a given plate to a target location. Generally, the depicted channels 1202 are machined into a surface of a given plate and used to distribute air to one or more components. The particular location and arrangement of holes 1200 and channels 1202 may be selected or designed for a particular application. Generally, the holes 1200 and channels 1202 are used as an alternative and/or supplement to hoses or piping for air transfer. The use of the air transfer plates 110, 120, 130, for example, may simplify attachment and/or detachment of various components from the mold tool 11. Generally speaking, channels 1202 of the air transfer plates 110, 120, 130 and/or other components of the mold tool 11 may be used to connect holes from different sub-assemblies that do not line up with each other. Further, various holes 1200 may be drilled at angles to help change the direction of an air path to a desired location.

In the illustrated embodiment, the first air transfer plate 110 may be used to distribute air, for example to the vacuum generators 202 (see FIG. 7). The second air transfer plate 120 may be used to transfer air, for example, for operating the separation pistons 205. The third air transfer plate 130, for example, may be used to transfer air to the lock/unlock cylinders 142.

As best seen in FIG. 6, the lock assembly brackets 152 are used to mount the lock assembly 140. The brackets 150 also help secure the lock assembly 140 in place, but also have associated air pathways 153 configured to provide pressurized air to the injection assembly 500 (See FIGS. 5B and 10).

It may be noted that the mold body 102 may also include various features (e.g., vacuum channel 109, transfer holes 111) configured for the transfer of air between components and/or subassemblies of the mold tool 11. For example, the vacuum channel 109 may be machined into the mold body 102 and used to connect holes from the vacuum plate 208 (see FIG. 7) to the mold body 102 to provide air transfer to the vacuum generators 202. As another example, the separation air orifices 210 (which may be configured generally similar to orifices 96), may be disposed in holes through the mold body 102. The separation air orifices 210 may be configured as 0.020" set screw orifices to control the flow of air. Use of the separation air orifices 210 may provide for improved air flow (e.g., relative to air flow without use of the separation air orifices 210) to continue to separate the cured sealant 42 from the mold body 102 even after one or more surfaces have been separated, thus opening or losing air pressure.

Figure 13A:
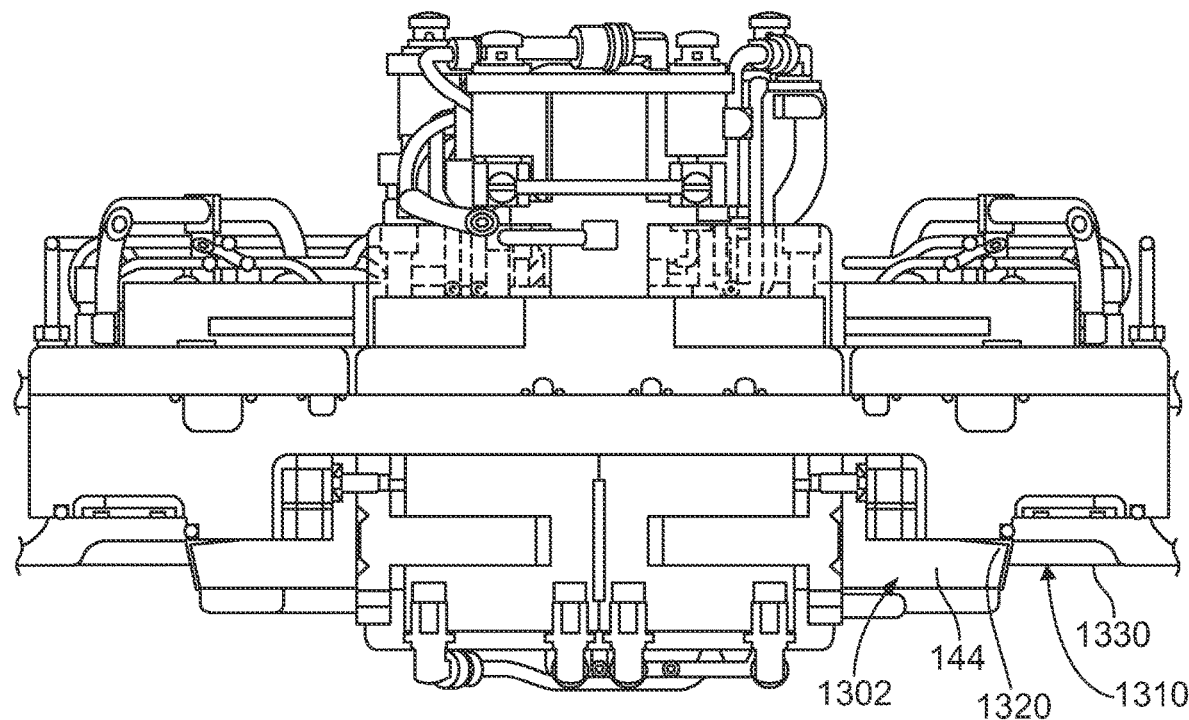
FIG. 13A depicts tapered locks 144 in an open position, according to an embodiment of the present disclosure.
Figure 13B:
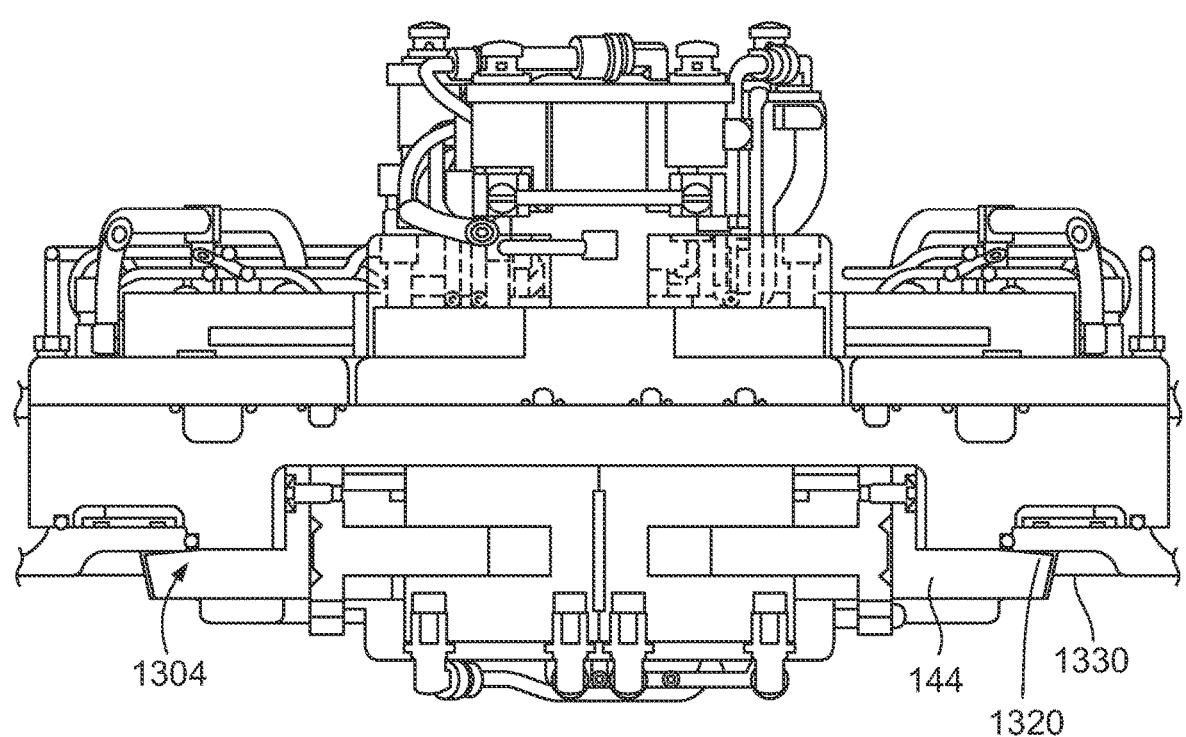
FIG. 13B depicts the tapered locks of FIG. 13A in a closed position.

As best seen in FIG. 6, the lock assembly 400 includes lock cylinders 142 and tapered locks 144. In the illustrated embodiment, a total of six lock cylinders 142, each having a tapered lock 144 disposed at an end, are shown. The lock cylinders 142 are configured to articulate the tapered locks 144. The lock cylinders 142 may be configured to be operated simultaneously. The lock cylinders 142, when activated, secure the mold tool 11 to the workpiece 2. For example, FIG. 13A depicts tapered locks 144 in an open or unlocked position 1302 and FIG. 13B depicts tapered locks 144 in a closed or locked position 1304. In the open position 302, the tapered locks 144 are positioned clear of, or to a side of, an access hole 1310, allowing the mold tool 11 to be inserted or removed from the access hole 1310. However, in the closed position 1304, the tapered locks 144 are extended, with the sloped surface 1320 urging the mold tool 11 toward the workpiece 2 as the tapered locks 144 extend against the surface 1330 of a panel (e.g., lower wing panel of an aircraft) into which the access hole 1310 is formed. The tapered locks 144 may be configured to provide a wedging action urging the mold tool 11 against the workpiece as the tapered locks 144 are advance. In various embodiments, the tapered locks 144 may be made of a plastic or other material configured to prevent damage to the workpiece 2. The lock cylinders 142 of the illustrated embodiment are double acting, utilizing air pressure to extend or retract. The interaction between the tapered locks 144 and the surface 1330 also helps to secure the mold tool 11 to the workpiece 2, allowing the mold tool 11 to travel with movement by the workpiece 2 and stay secured to the workpiece 2. Further, the pressure in the lock cylinders 142 is applied during application of the vacuum in various embodiments, with the wedging action provided by the tapered locks 144 therefore provided as the vacuum further urges the mold tool 11 against the workpiece 2. Accordingly, the lock assembly 140 helps maintain the mold tool 11 in the position resulting from application of the vacuum.

As best seen in FIGS. 11B and 11C, the mold body 102 includes lock cylinder pockets 115. The lock cylinder pockets 115 are machined into the mold body 102 and configured to accept the lock cylinders 142. In the illustrated embodiment, the lock cylinder pockets 115 are configured so that a given lock cylinder 142 butts up against a corresponding lock cylinder 142, such that the reactive forces of the lock cylinder 142 acts in opposite directions against each other. The retaining ring 150 in the depicted embodiment provides a reactive force to counteract the forces on the tapered locks 144 to facilitate the locking of the tapered locks 144 to the workpiece 2.

As best seen in FIG. 11A, the mold body 102 also includes separation piston pockets 113. The separation piston pockets 113 are configured to house the separation pistons 205. (See also FIGS. 4A and 4B, and related discussion.) Also, the mold body 102 includes injection ports 103. The injection ports 103 are pockets machined into the mold body 102. In the illustrated embodiment, the injection ports 103 are configured to accept injection port inserts 108 (see FIG. 6).

The injection port inserts 108 are configured to fit both the injection ports 103 as well as the tip of a sealant container to form a leak proof and air tight seal so that the sealant 42 may be introduced into the mold volume 101 without leaks. The injection port inserts 108 may also be configured to align the tip of a sealant container to injection the sealant 42 directly into the mold volume 101. The thumbscrews 160 (see FIG. 11C) are configured to secure the injection port inserts 108 in the injection ports 103.

FIG. 7 provides an exploded perspective view of the vacuum assembly 200. As seen in FIG. 7, the vacuum assembly 200 includes vacuum generators 202, separation cylinders 204 (provided with air by separation cylinder air lines 203), separation air lines 206, a vacuum plate 208, and separation pressurized air orifices 210. Generally, the vacuum assembly 200 is configured to generate the vacuum applied during injection of the sealant 42, and also houses at least a portion of the vacuum plumbing (e.g., hoses 201). In the illustrated embodiment, the vacuum assembly also includes the separation cylinders 204 used to control the separation pistons 205, as well as the separation air lines 206 used to provide the separation air flow (e.g., separation pressure 56). The vacuum plate 208 may be made of acrylic and polished to facilitate viewing of the sealant 42 flowing in the mold volume 101.

The vacuum generators 202 create the vacuum within the vacuum channel 109 that is applied to the mold volume 101 via the set screw orifices 190. In the illustrated embodiment, a total of eight vacuum generators 202 are employed. In some embodiments, the vacuum generators are configured to use air pressure and the Venturi Effect to create the vacuum used by the mold tool 11. The use of a number of vacuum generators 202 feeding one or more vacuum channels 109 allows for one or more vacuum generators 202 to lose effectiveness while still providing a desired or useful vacuum to the mold volume 101. Vacuum lines 207 may be utilized to place the vacuum generators 202 in fluid communication with the set screw orifices 190 via one or more vacuum channels 109. As discussed herein, application of a vacuum to the mold volume 101 helps pull out air bubbles and voids, as well as improving flow of the sealant 42 to help create a smoother filling of the mold volume 101.

As discussed herein, the vacuum assembly 200 may also be utilized to provide a separation air pressure 56 used to aid separation of the mold tool 11 from the cured sealant 42. The separation air pressure 56 may be used to separate cured sealant 42 from the exposed surfaces of the mold volume 101 making it possible to remove the mold tool 11 without tearing the cured sealant 42. In various embodiments, standard shop air (e.g., at between 90-100 psi) may be used for all or a portion of the various processes performed by the mold tool 11. The air (e.g., from supply 70) may be provided continuously to the mold tool 11 at least until the sealant 42 is solidified (not necessarily fully cured), to help maintain the separation pistons 205 in the closed position and preventing migration of sealant 42 into the separation ports 54. The separation pressurized air orifices 210 may be utilized to control the air flow to each separation piston pocket 113 (or other separation port 56), thereby allowing air from each separation piston pocket 113 to continue to push air against the sealant 42 even after an initial separation.

Figure 8:
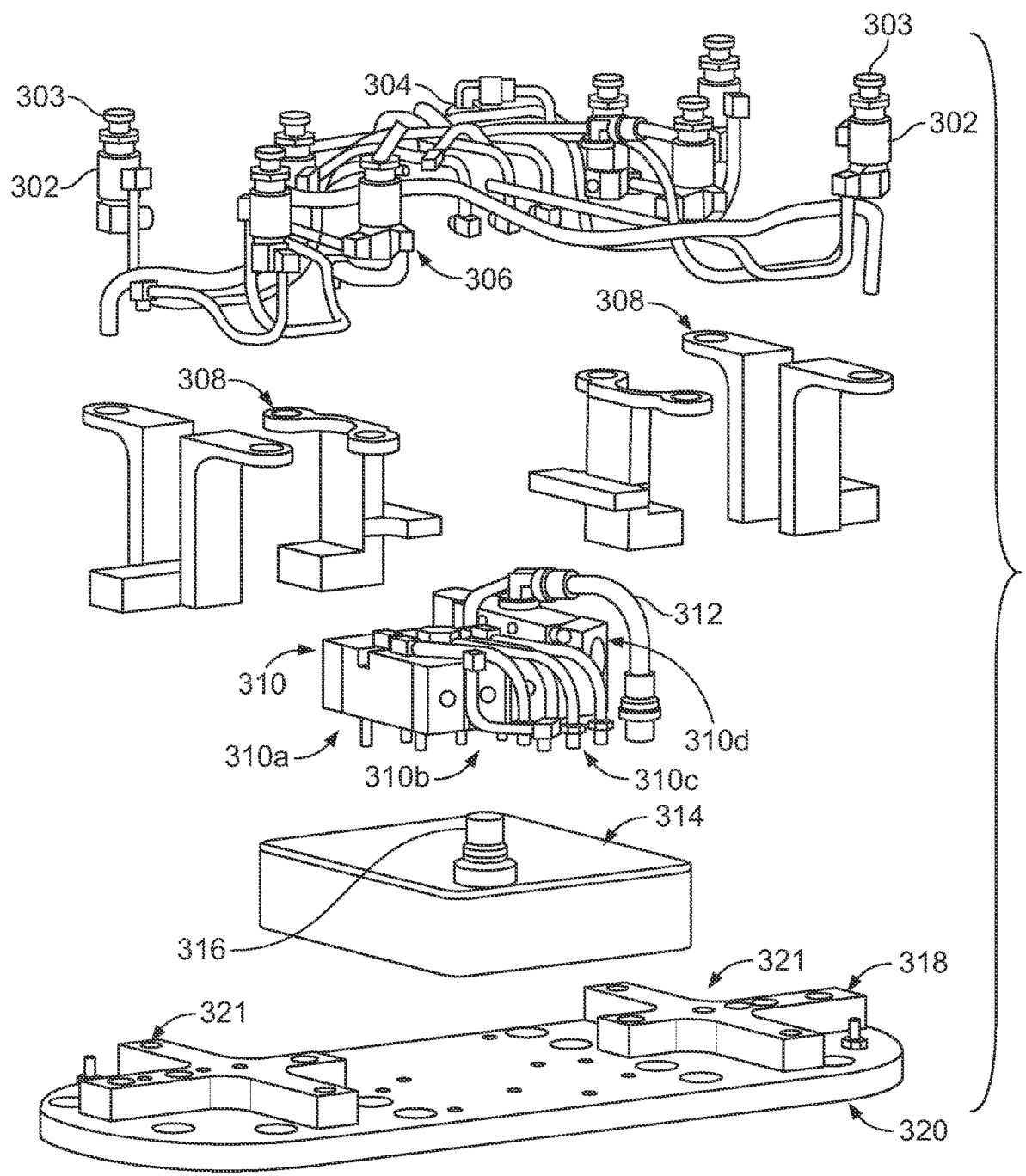
FIG. 8 provides an exploded perspective view of an air control mount assembly, according to an embodiment of the present disclosure.

FIG. 8 provides an exploded perspective view of the air control mount assembly 300. The air control mount assembly 300 includes air control switches 302 (and corresponding air control buttons 303), air control tubing 304, toggle switch 306, brackets 308, air control solenoids 310, air control tubing 312, air control block mount 314 (including air connection 316 for connection with supply 70 (e.g., shop air supply)), handle mount boss 318 and mounting plate 320. By pressing a given air control button 303, the corresponding air control switch 302 is activated. Each air control switch 302 governs the setting of at least one of the air control solenoids 310 to provide a desired air path to perform one or more processes discussed herein. For example, in the illustrated embodiment, four solenoids 310a, 310b, 310c, 310d are provided. Each solenoid 310a, 310b, 310c, 310d may be utilized in connection with one or more of the subassemblies to perform one or more of the processes disclosed herein (e.g., extend or retract lock cylinders 142, apply vacuum, injection sealant 42, or provide separation air, among others). Accordingly, in the illustrated embodiment, by depressing a given button, a corresponding solenoid acts to direct a desire air flow for performance of a corresponding task or process.

The mounting plate 320 in the illustrated embodiment provides an interface between the mold body 102 and the frame 400. The mounting plate 320 is also used to mount the brackets 308, and the air control block mount 314. Air may be transferred through the mounting plate 320 to the mold body 102 and/or frame 400. The frame 400 may be mounted to the mounting plate 320 via openings 321 in the handle mount boss 318. Similar to the mold body 102, the mounting plate 320 may have various holes and/or channels provided therein to facilitate direction of air flows for the various processes described herein.

In the illustrated embodiment, the air control block mount 314 provides a platform for the solenoids 310 used to introduce air pressure into various components or aspects of the mold tool 11 to perform the tasks or processes discussed herein. The air supply 70 (e.g., shop air) is coupled to the air control block mount 314 via the air connection 316, with the air control block mount 314 configured to deliver air from the supply 70 to the air control switches 302 and air control solenoids 310, and to feed pressurized air to the air control system 12. The solenoids 310 generally either supply pressurized air to a corresponding target location or close off the supply of air, thereby turning processes discussed herein "on" or "off." It may be noted that, while the air control switches 302 are configured as spring return buttons 303, the toggle switch 306 is configured as a toggle to supply air pressure to the injection subassembly 500 instead of to a solenoid 310. When the toggle switch 306 is "on," sealant 42 is injected into the mold volume 101, and when the toggle switch 305 is "off," sealant 42 is not injected into the mold volume 101.

Figure 9:
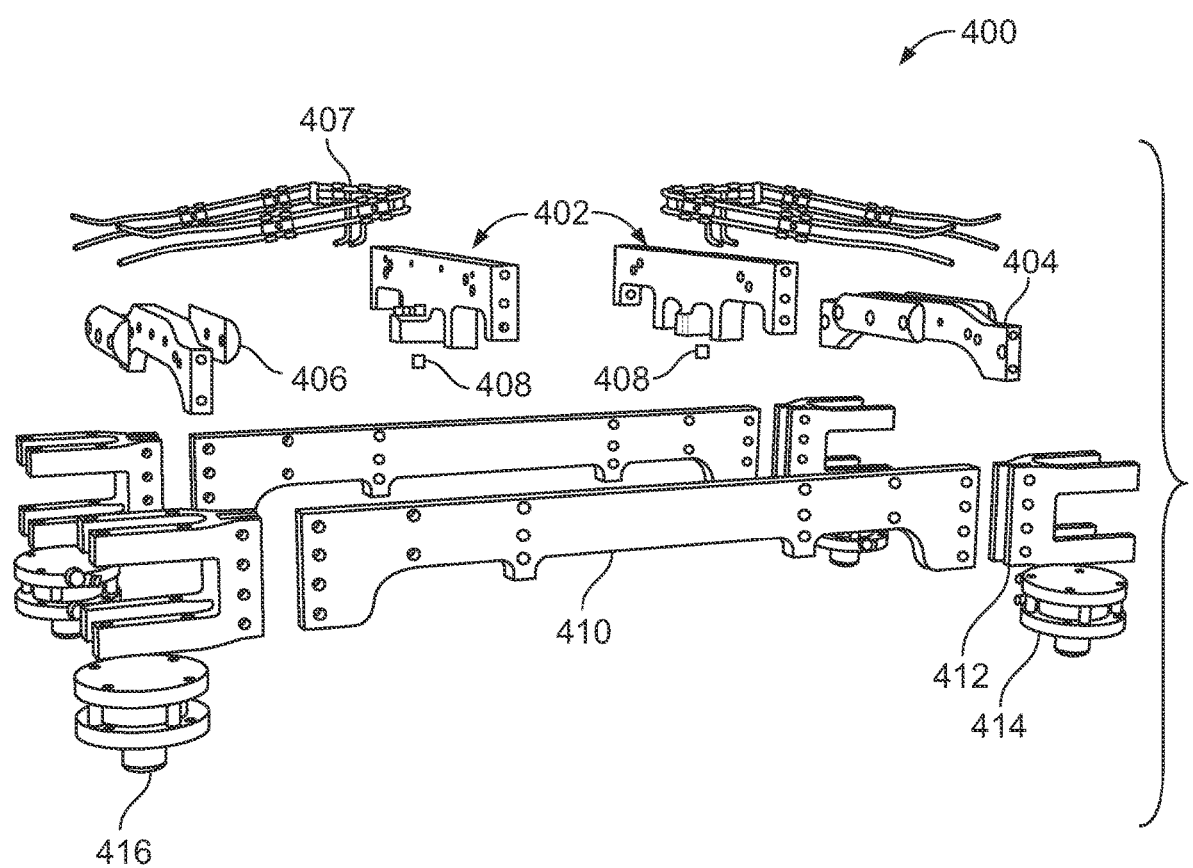
FIG. 9 provides an exploded perspective view of a frame, according to an embodiment of the present disclosure.

FIG. 9 provides an exploded perspective view of the frame 400. As seen in FIG. 9, the frame 400 includes attach rails 402, handle rails 404, handle pads 406, air control tubing 407, flow control orifices 408, cylinder rails 410, cylinder rail claws 412, pushing cylinders 414, and piston pads 416. Generally the frame 400 provides for handling of the mold tool 11 and for the force necessary to pull the tool 11 from the workpiece 2 after the sealant 42 has cured. The pushing cylinders 414 are configured to extend to urge the mold tool 11 away from the workpiece 2, facilitating the removal of the mold tool 11 from the workpiece 2.

The attach rails 402, handle rails 404, cylinder rails 410, and cylinder rail claws 412 may be bolted and/or doweled together, and are used to transfer forces created by the pushing action of the pushing cylinders 414 against the workpiece. The attach rails 402 may be utilized to attached the frame assembly 400 to the handle mount boss 318. Additionally, the attach rails 402 may have channels and/or holes (e.g., generally similar to holes 1200 and channels 1202) therethrough, which cooperate with the air control tubing 407 for the provision of air to the pushing cylinders 414. The handle rails 404 attach between the cylinder rails 410. In the illustrated embodiment, the handle rails 404 provide for mounting of the handle pads 406, and also add stiffness to the frame assembly 400. The handle pads 406 help facilitate the manipulation of the frame assembly 400 by an operator.

In the illustrated embodiment, the cylinder rails 410 provide for the attachment of the pushing cylinders 414 to the frame assembly 400, and serve to transfer force generated by the pushing cylinders 414 to the attach rails 402. The cylinder rail claws 412 may be machined end pieces to the cylinder rails 410. For example, the cylinder rail end claws may be press fit and doweled into position. The cylinder rail claws 412 are configured to mount the pushing cylinders 414 to the frame assembly 400.

The pushing cylinders 414 create force to urge the mold tool 11 from the workpiece 2 and cured sealant 42. In some embodiments, the pushing cylinders may generate about 1250 pounds of force. The force generated will be dependent on the pressure provided from the supply 70. In the illustrated embodiment, the pushing cylinders 414 are flow controlled to create force slowly and smoothly. The piston pads 416 are attached to ends of the pushing cylinders 414. The piston pads 414 contact the surface 3 of the workpiece 2 and may be made of a plastic or other material to avoid scratching the workpiece 2.

Figure 10:
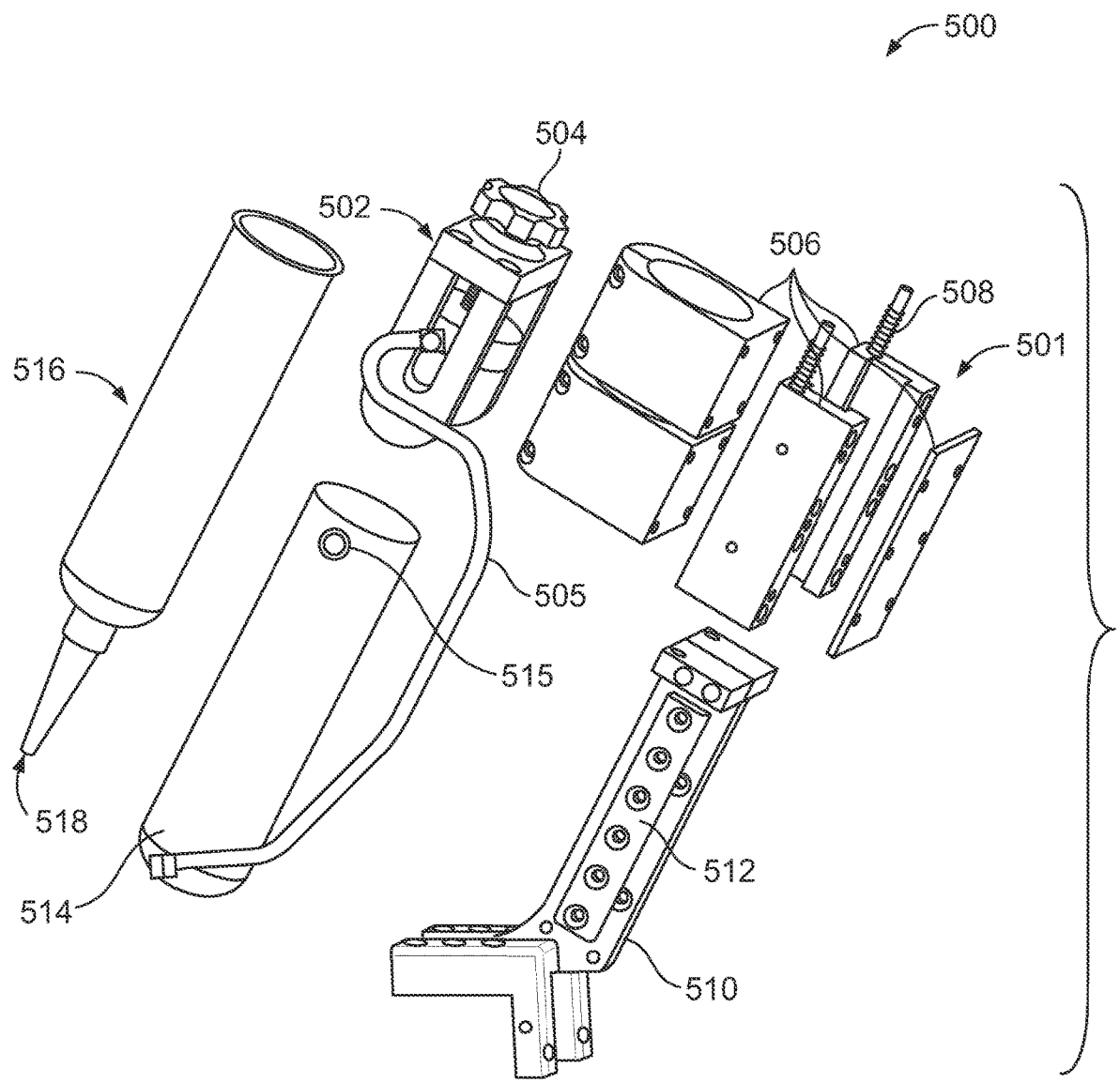
FIG. 10 provides an exploded perspective view of an injection assembly, according to an embodiment of the present disclosure.

FIG. 10 provides an exploded perspective view of the injection assembly 500. As seen in FIG. 10, the injection assembly 500 includes a sealant dispenser 501 that includes a pressure cap assembly (including a tightening knob 504), a sliding bracket assembly 506 (including springs 508), a mounting frame 510 (including a vertical slide guide rail 512), a metal sleeve 514, and a sealant cartridge 516 having a cartridge tip 518. One sealant dispenser 501 is shown in FIG. 10; however, two or more sealant dispensers 501 (e.g., disposed on opposite sides of a mold body 102) may be utilized in various embodiments.

The sealant dispenser 501 is configured to hold the sealant cartridge 516 in a desired orientation in an airtight fixture. The sealant dispenser 501 is also configured to apply the necessary force on the cartridge tip 518 to form an air tight seal in the injection port inserts 108, allowing the mold tool 11 to apply air pressure to one or more sealant cartridges 516 to feed the sealant 42 into the mold volume 101. In some embodiments, when the mold volume 101 has been filled with a desired amount of the sealant 42, the sealant dispensers 501 may be turned off, but the sealant cartridges 516 left in place until curing is complete. The sealant cartridges 516 may then be removed from the mold tool 11 after the mold tool 11 is removed from the workpiece 2. It may be noted that, in various embodiments, the sealant 42 may be disposed manually using handheld sealant dispensers.

In various embodiments, the sealant dispenser 501 may be prepared for use by unscrewing the tightening knob 504 and tilting the pressure cap assembly 502 out of the way. Then, a sealant cartridge 516 is slid into the metal sleeve 514. Next, the pressure cap assembly 502 is tilted back over the sealant cartridge 516, and the tightening knob 504 tightened to form an air tight seal between the pressure cap assembly 502 and the sealant cartridge 516.

The mounting frame 510 attaches the sealant dispenser 501 to the mold body 102. The vertical slide guide rail 512 is configured to act as a sliding rail for the sliding bracket assembly 506. The mounting frame 510, for example, may be made of aluminum.

The sliding bracket assembly 506 slides up and down the mounting frame, and may be made of a plastic to provide efficient sliding against the vertical slide guide rail 512. The metal sleeve 514 may be positioned and held into place so that when a prepared sealant cartridge 516 is inserted, the springs 508 provide sufficient force to create a seal between the sealant cartridge tip 518 and the injection port insert 108. The metal sleeve 514 is configured to hold the sealant cartridge 516, and provides an opposing force for the pressure cap assembly 502 to seal the sealant cartridge 516 in place. The springs 508 apply a force between the mounting frame 510 and the sliding bracket assembly 506 to urge the sealant cartridge tip 518 against the injection port 103, thereby creating a seal between the sealant cartridge tip 518 and the injection port insert 108.

The pressure cap assembly 502 acts to hold the sealant cartridge 516 in the metal sleeve 514. When tightened, the pressure cap assembly 502 forms an airtight seal between the sealant cartridge 516 and the pressure cap assembly 502, making it possible to introduce air pressure through into the sealant cartridge 516 to push the sealant 42 into the mold volume 101. When the air pressure is stopped and released from the sealant cartridge 42, the sealant 42 stops flowing into the mold volume 101. The air pressure may be provided via the tubing 505, which may be provided with air pressure under the control of the toggle switch 306.

The sealant cartridge 516, for example, may be a standard 6 inch sealant cartridge used for production sealants commonly used in the aerospace industry. In some embodiments, the sealant cartridge 516 may be stored at −40 degrees Fahrenheit. The sealant 42 may be used at about 70 degrees Fahrenheit. The cartridge tip 518 may be a standard, straight 2 inch tip made for the sealant cartridge 516. The tip 518, for example, may have an orifice of about ⅛" through which the sealant 42 is fed. It may be noted that because use of the mold tool 11 provides for faster and more accurate placement of the sealant 42, the sealant 42 may have a shorter time to solidify and/or cure than sealants used with conventional manual sealing approaches.

Figure 14:
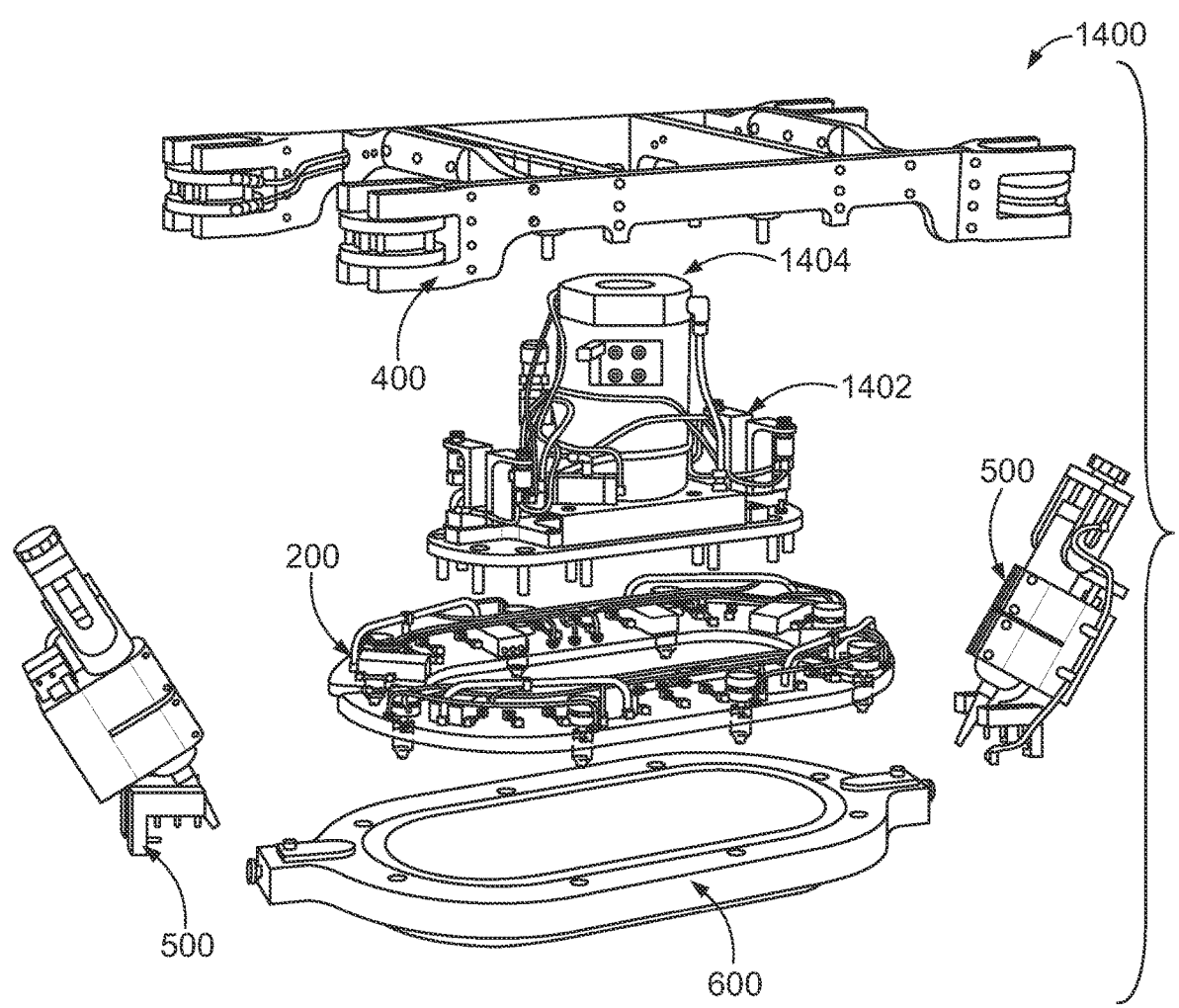
FIG. 14 provides an exploded perspective view of a mold tool, according to an embodiment of the present disclosure.

It may be noted that while the embodiment depicted in FIG. 5 is configured for manual placement by an operator, in other embodiments, the mold tool 11 may be configured for placement by a robot. FIG. 14 provides an exploded perspective view of a mold tool 1400 configured for placement by a robot 1500, and FIG. 15 depicts a perspective view of the robot 1500 and the mold tool 1400.

As seen in FIG. 14, the mold tool 1400 includes a mold assembly 100, a vacuum assembly 200, a mounting assembly 1402, a frame 400, and an injection assembly 500. The mold assembly 100, vacuum assembly 200, frame 400, and injection assembly 500 may be generally similar to the similar named and numbered components discussed above in connection with the embodiment depicted in FIG. 5. The mounting assembly 1402 may be generally similar with the air control assembly 300 in certain respects; however the mounting assembly 1402 is configured for use with a robotic arm 1502 of the robot 1500 (see FIG. 15) as part of an automated process. In the illustrated embodiment, the mounting assembly 1402 includes a quick disconnect 1404 configured for mounting to a robotic arm. In addition to housing or mounting the various switches and solenoids associated with the air control system 12, the mounting assembly 1402 is also configured to receive pressurized air from the supply 70 via the robotic arm 1502. Use of a mold tool 1400 including a mounting assembly 1402 configured for use with a robot 1500 enables use of the mold tool 1400 as part of a fully automated process. For example, the robot 1500 may place the mold tool 1400 into a desired position and also activate the various processes or tasks performed by the mold tool 1400 discussed herein.

Figure 15:
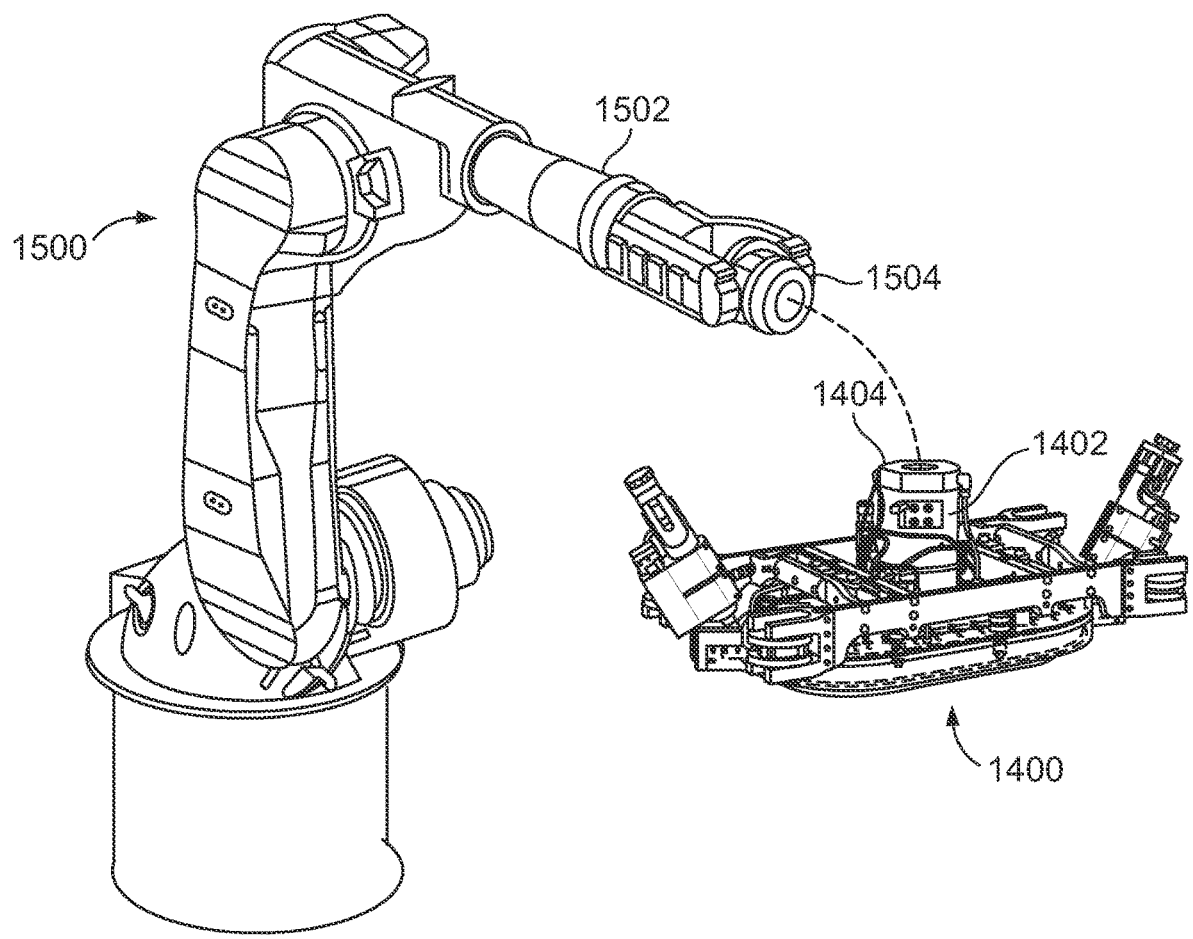
FIG. 15 depicts a perspective view of a robot and mold tool, according to an embodiment of the present disclosure.

As seen in FIG. 15, the robot 1500 includes a robotic arm 1502. The robot 1500 may be configured as a standard 6 axis robot. The robot 1500 includes a quick disconnect 1504 at the free end of the robotic arm 1502. The quick disconnect 1504 of the robot cooperates with the quick disconnect 1404 of the mounting assembly 1402 to attach and detach the mold tool 1400 to the robot 1500. It may be noted that the quick disconnect 1404 of the mounting assembly 1402 may also be configured to mate with or accept pressurized air from the air supply 70 when not mounted to the robot 1500, for example to provide operation of one or more aspects of the mold tool 1400 when the mold tool 1400 is disconnected from the robot 1500, for example when traveling with the workpiece 2.

Figure 16:
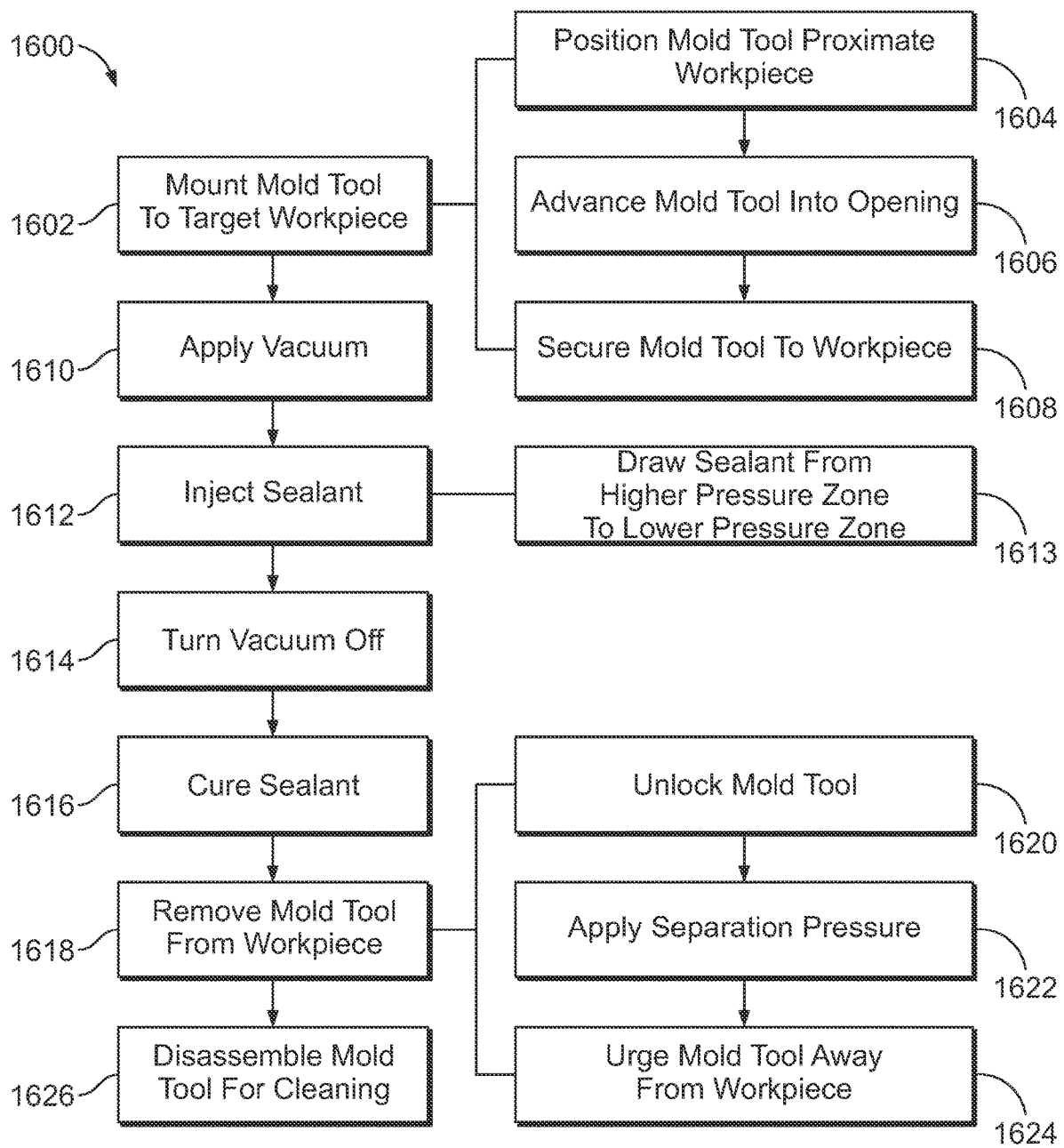
FIG. 16 is a flowchart of a method, according to an embodiment of the present disclosure.

FIG. 16 provides a flowchart of a method 1600 for providing sealing to a workpiece using a mold tool, in accordance with various embodiments. The method 1600, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

Figure 17:
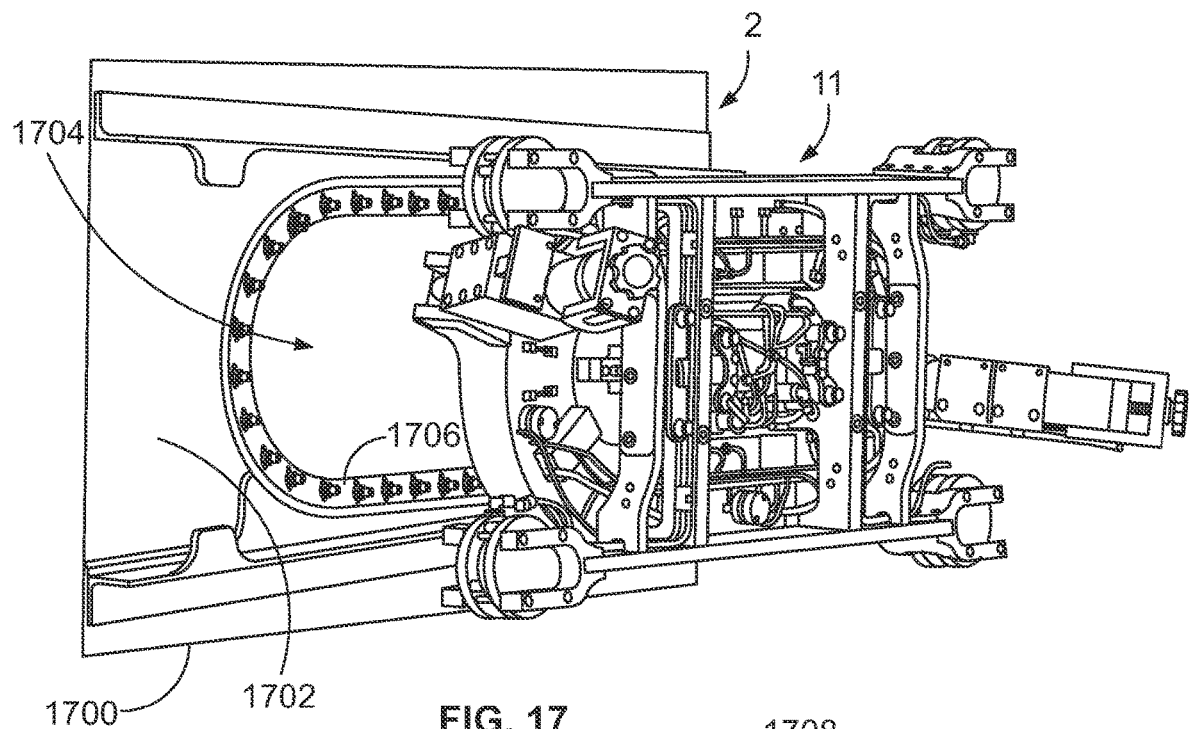
FIG. 17 depicts a mold tool being positioned proximate a workpiece.
Figure 18:
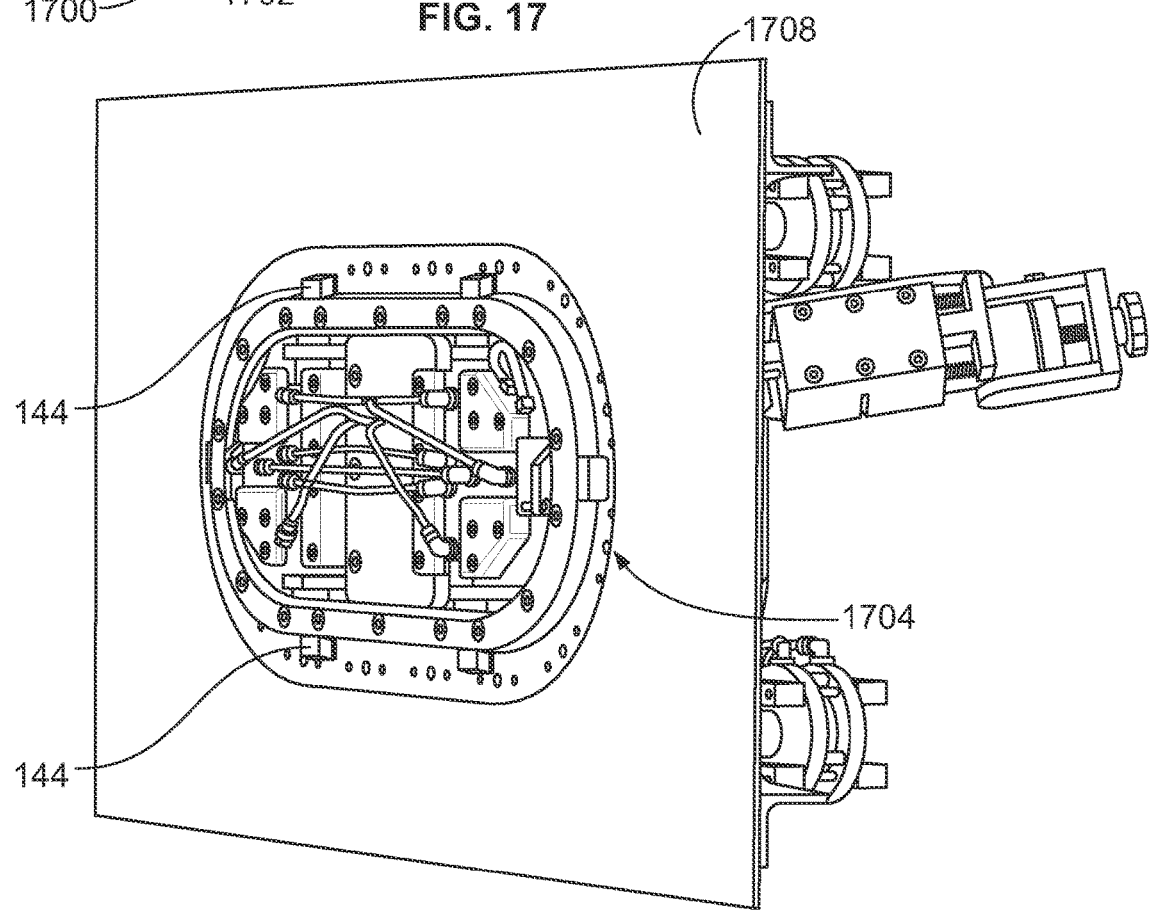
FIG. 18 depicts tapered locks securing a mold tool to a workpiece.

At 1602, a mold tool (e.g., mold tool 10, mold tool 11, mold tool 1400) is mounted to a target workpiece (e.g., workpiece 2). For example, at 1604, the mold tool 11 may be positioned proximate the workpiece 2 as shown in FIG. 17. As seen in FIG. 17, the workpiece 2 is configured as a wing 1700 having a first surface 1702 with an opening 1704 extending through the wing 1700. The opening 1704 is surrounded by a nutplate ring 1706 which the mold tool 11 will be used to seal. With continued reference to FIG. 16, at 1606, the mold tool 11 is advanced into the opening 1704 of the workpiece 2. Then, at 1608, the mold tool 11 is secured to the workpiece 2. For example, the mold tool 11 may be secured to the workpiece 2 via a lock assembly 140 including tapered locks 144, with the lock assembly 140 controlled by an air control system 12. For example, an operator may depress a button (or a robot may actuate a system) to cause the air control system 12 to direct a positive air pressure to extend lock cylinders 142 of the lock assembly. As seen in FIG. 18, the tapered locks 144 may extend past the opening 1704 to engage a second surface 1708 (the second surface 1708 is opposite the first surface 1702) to secure the mold tool 11 to the workpiece 2.

At 1610, a vacuum is applied to a mold volume (e.g., mold volume 101) of the mold tool 11. The vacuum may be applied via vacuum application ports and under control of the air control system 12. As discussed herein, the mold volume may include sub-volumes (e.g., nutplate domes) configured to provide sealant around nutplates of the nutplate ring 1706. Application of the vacuum improves sealant flow and reduces air bubble or void formation in various embodiments.

At 1612, sealant (e.g., sealant 42) is injected into the mold volume of the mold tool 11. For example, as discussed herein, sealant may be injected into sub-volumes of the mold volume via sealant injection ports to cover features (e.g., nutplates, rivets, or the like) with the sealant. As discussed herein, the sealant flow may be improved under the influence of the vacuum (which may help draw the sealant through the mold volume), and air bubble formation may be prevented or impeded due to the influence of the vacuum. The sealant may be provided to the sub-volumes via a mold channel. The sealant in some embodiments may be injected from one or more sealant cartridges that have been pre-loaded onto the mold tool 11 before the mold tool 11 is secured to the workpiece 2. The sealant may be injected, for example, until a desired amount of sealant has been introduced into the mold. For example, at least a portion of the mold tool 11 may be clear (e.g., transparent or translucent) to allow a visual determination of when a desired amount of sealant has been injected. For example, in embodiments using injection ports on opposite sides of the mold tool, sealant may be injected for a short time (e.g., three seconds) after opposing sealant flows are observed to meet and meld together, to provide a back pressure for improving the meld while preventing overfilling that may cause sealant to bleed through one or more portions of the mold tool 11. With the vacuum applied, at 1613, as the sealant is injected, the sealant that has been injected into the sub-volumes is drawn from a higher pressure zone (e.g., portions of the sub-volumes proximate the mold channel) to a lower pressure zone (e.g., portions of the sub-volumes proximate the vacuum application ports.

At 1614, the vacuum may be turned off, after the sealant injection has stopped. At 1616, the sealant is cured. For example, the mold tool 11 may be left secured to the workpiece 2 overnight or for another predetermined time period to allow the sealant 42 to cure. In some embodiments, the sealant may be heated to shorten the time for curing. For example, a cover may be placed over the mold tool 11 and the air surrounding the mold tool 11 heated in order to heat the mold tool 11 (and the sealant 42 inside the mold tool 11). In embodiments where the workpiece 2 is moved during curing, the air supply 70 may be disconnected from the mold tool 11 after the sealant has solidified and re-attached for the removal process.

At 1618, the mold tool 11 is removed from the workpiece 2. For example, in some embodiments, at 1620, the mold tool 11 is unlocked from the work piece (e.g., the tapered locks 144 are retracted). Next, at 1622, a separation pressure may be applied to the sealant 42 via at least one separation port 54. The separation pressure may provide an air film between the sealant 42 and the mold volume to initiate separation. In the illustrated embodiment, at 1624, a pushing force urges the mold tool 11 away from the workpiece. The pushing force may be applied, for example, by pushing pistons 414.

At 1626, the mold tool 11 may be disassembled for cleaning. For example, any remaining sealant may be removed from the mold volume, and any sealant that entered vacuum application ports and/or separation ports may be removed. Once cleaned, the mold tool 11 may be re-assembled and used for a subsequent sealing process.

Figure 19:
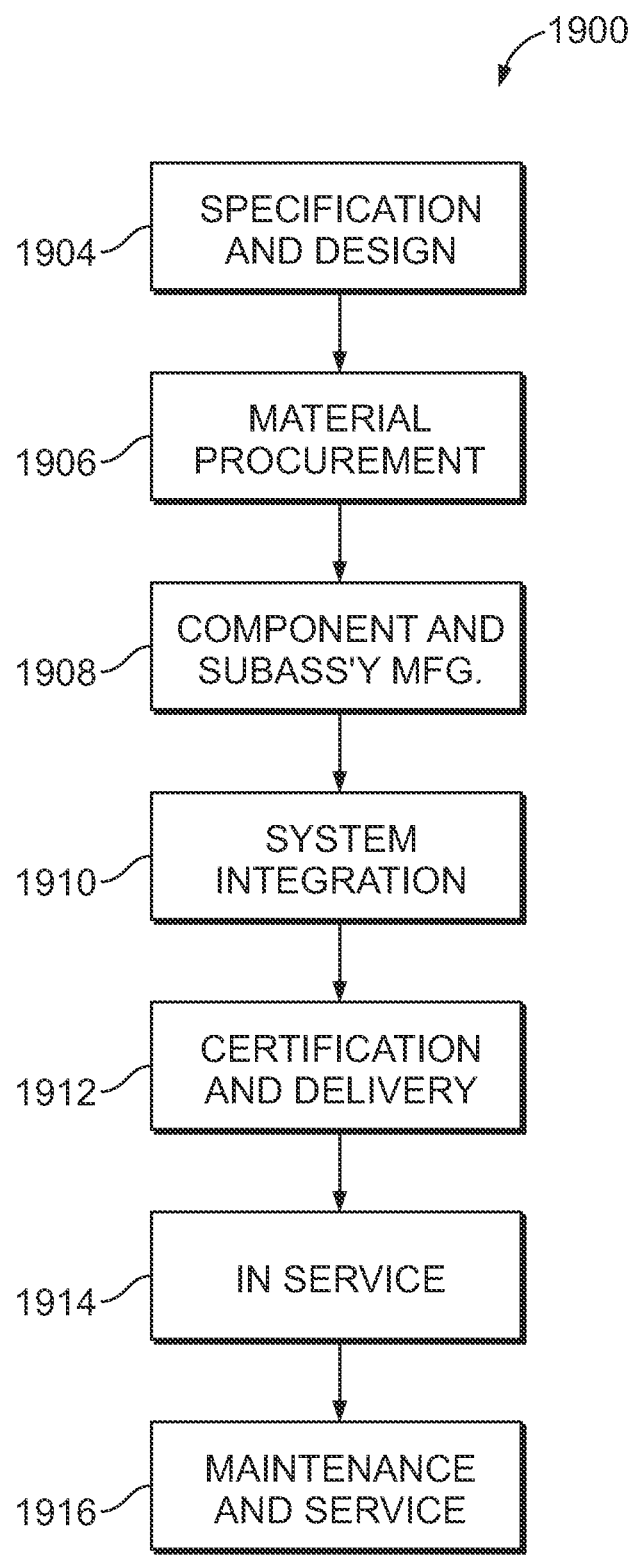
FIG. 19 is a block diagram of aircraft production and service methodology.
Figure 20:
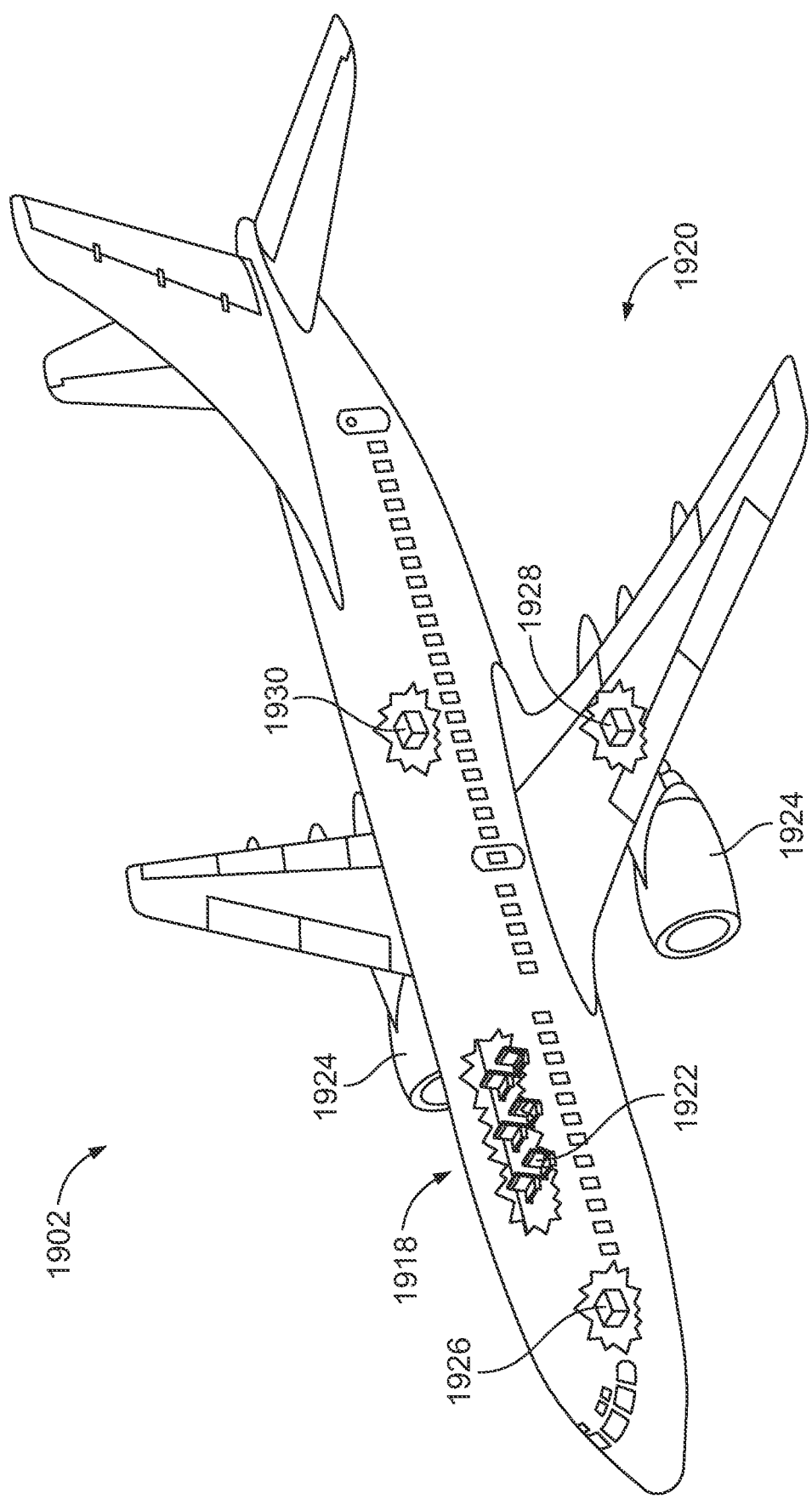
FIG. 20 is a schematic illustration of an aircraft.

Examples of the present disclosure may be described in the context of aircraft manufacturing and service method 1900 as shown in FIG. 19 and aircraft 1902 as shown in FIG. 20. During pre-production, illustrative method 1900 may include specification and design (block 1904) of aircraft 1902 and material procurement (block 1906). During production, component and subassembly manufacturing (block 1908) and system integration (block 1910) of aircraft 1902 may take place. Thereafter, aircraft 1902 may go through certification and delivery (block 1912) to be placed in service (block 1914). While in service, aircraft 1902 may be scheduled for routine maintenance and service (block 1916). Routine maintenance and service may include modification, reconfiguration, refurbishment, etc. of one or more systems of aircraft 1902. For example, in various embodiments, examples of the present disclosure may be used in conjunction with one or more of blocks 1908, 1910, or 1916.

Each of the processes of illustrative method 1900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 20, aircraft 1902 produced by illustrative method 1900 may include airframe 1918 with a plurality of high-level systems 1920 and interior 1922. Examples of high-level systems 1920 include one or more of propulsion system 1924, electrical system 1926, hydraulic system 1928, and environmental system 1930. Any number of other systems may be included. Although an aerospace example is shown, the principles disclosed herein may be applied to other industries, such as the automotive industry. Accordingly, in addition to aircraft 1902, the principles disclosed herein may apply to other vehicles, e.g., land vehicles, marine vehicles, space vehicles, etc. In various embodiments, examples of the present disclosure may be used in conjunction with one or more of airframe 1918 or interior 1922.

Apparatus(es) and method(s) shown or described herein may be employed during any one or more of the stages of the manufacturing and service method 1900. For example, components or subassemblies corresponding to component and subassembly manufacturing 1908 may be fabricated or manufactured in a manner similar to components or subassemblies produced while aircraft 1902 is in service. Also, one or more examples of the apparatus(es), method(s), or combination thereof may be utilized during production stages 1908 and 1910, for example, by substantially expediting assembly of or reducing the cost of aircraft 1902. Similarly, one or more examples of the apparatus or method realizations, or a combination thereof, may be utilized, for example and without limitation, while aircraft 1902 is in service, e.g., maintenance and service stage (block 1916).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:
mounting a bottom surface of a mold tool to a surface of an object having fasteners to be sealed, wherein the mold tool comprises a mold body defining a mold volume configured to receive sealant, the mold volume comprising mold sub-volumes and a mold channel fluidly coupling the mold sub-volumes, the mold body including sealant injection ports in fluid communication with the mold volume, the mold body including vacuum application ports in fluid communication with the mold sub-volume, each vacuum application port extending from the mold body to a corresponding individual mold sub-volume, wherein each individual mold sub-volume is disposed over only a single corresponding fastener of the object to be sealed when the bottom surface of the mold tool is mounted to the object be sealed, wherein mounting the bottom surface of the mold tool to the surface of the object comprises positioning the mold tool such that each of the mold sub-volumes is disposed in a predetermined position corresponding to a location of the corresponding fastener;

injecting sealant into the mold sub-volumes disposed over corresponding fasteners of the object to be sealed;

drawing the sealant from a higher pressure zone into a lower pressure zone in at least one of the sub-volumes to cover at least one of the fasteners, wherein the method includes applying a vacuum to each mold sub-volume via the corresponding vacuum application port with an air control system operably coupled to the mold body.

2. The method of claim 1, further comprising:
injecting the sealant into the mold volume via the sealant injection ports;
curing the sealant; and
removing the mold from the object.

3. The method of claim 1, wherein each vacuum application port extends from a top surface of the mold body to a corresponding individual mold sub-volume.

4. The method of claim 1, wherein the mold body comprises at least one separation port in fluid communication with the mold volume, wherein removing the mold from the object comprises applying a separation pressure to the sealant via the at least one separation port under control of an air control system.

5. The method of claim 1, further comprising securing the mold tool to the object via locks under control of the air control system.

6. The method of claim 1, wherein removing the mold tool from the object comprises applying a pushing force urging the mold tool away from the object via pushing pistons under control of the air control system.

7. The method of claim 1, wherein injecting the sealant comprises delivering the sealant from a sealant injection assembly to the mold volume under control of the air control system, wherein the sealant injection assembly comprises a sealant container, the sealant injection assembly operably coupled to the sealant injection ports and configured to deliver the sealant from the sealant container to the mold volume under control of the air control system.

8. The method of claim 1, wherein the air control system is configured as an air-controlled logic system, the method further comprising applying a vacuum to the mold sub-volumes under control of the air-controlled logic system.

9. The method of claim 8, wherein the air control system comprises plural air control switches and corresponding solenoids, each air control switch governing the setting of at least one of the corresponding solenoids to provide a desired air path, the method further comprising controlling operation of the mold tool via the air control switches.

10. The method of claim 1, wherein the fasteners comprise nut-plates extending above the surface of the object, wherein mounting the mold tool comprises positioning each separate mold sub-volumes over only a single corresponding individual nut-plate, wherein only a single nut-plate is disposed within each corresponding mold sub-volume.

11. The method of claim 1, wherein the mold sub-volumes are configured as domes configured to be positioned over corresponding fasteners.

12. The method of claim 1, wherein the vacuum application ports comprise corresponding orifices, the orifices having a diameter sized and configured to inhibit flow of sealant therethrough.

13. The method of claim 12, wherein the diameter is 0.010 inch or less.

14. The method of claim 1, wherein the mold body comprises at least one of a transparent material or a translucent material.

15. The method of claim 1 further comprising securing the mold tool to the object via locks.

16. The method of claim 1, the mold tool further comprising a plurality of air plates comprising a plurality of channels configured to direct transfer of air between the vacuum assembly and the mold volume.

17. The method of claim 16, wherein the plurality of channels is configured to direct transfer of air between the air control system, the vacuum assembly, and the mold volume.

18. The method of claim 1, further comprising switching the at least one separation port between open and closed positions.

19. The method of claim 18, wherein switching the at least one separation port between the open and the closed positions comprises switching the at least one separation port with at least one corresponding separation piston.

20. The method of claim 6, wherein the mold tool comprises a frame, the mold body coupled to the frame, wherein the pushing pistons are mounted to the frame.

* * * * *